(12) United States Patent
Ashraf et al.

(10) Patent No.: US 10,131,381 B2
(45) Date of Patent: Nov. 20, 2018

(54) JOINT FOR AN UNDERBODY OF A MOTOR VEHICLE

(71) Applicant: Faraday & Future Inc., Gardena, CA (US)

(72) Inventors: Umran Ashraf, San Diego, CA (US); John Michael Colt, Rendondo Beach, CA (US); Rene Johan Veltman, Torrance, CA (US); Cory Denis Borghi, Torrance, CA (US); Ye Jin, Carson, CA (US); Gregory Scott Zinkel, Austin, TX (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/240,976

(22) Filed: Aug. 18, 2016

(65) Prior Publication Data

US 2017/0001667 A1    Jan. 5, 2017

Related U.S. Application Data

(63) Continuation-in-part of application No. 15/078,871, filed on Mar. 23, 2016, and a continuation-in-part of application No. 14/840,741, filed on Aug. 31, 2015.
(Continued)

(51) Int. Cl.
*B62D 21/15* (2006.01)
*B62D 21/03* (2006.01)
(Continued)

(52) U.S. Cl.
CPC ............. *B62D 21/15* (2013.01); *B60K 1/04* (2013.01); *B62D 21/03* (2013.01); *B62D 63/025* (2013.01);
(Continued)

(58) Field of Classification Search
CPC .... B62D 21/15; B62D 21/152; B62D 21/155; B62D 21/157; B62D 21/02; B62D 21/03;
(Continued)

(56) References Cited

U.S. PATENT DOCUMENTS 3,869,017 A * 3/1975 Feustel .................. B60K 5/00
180/232
4,173,264 A    11/1979 Erker et al.
(Continued)

FOREIGN PATENT DOCUMENTS

JP    2007-283868 A    11/2007
JP    2012-166673 A    9/2012
(Continued)

OTHER PUBLICATIONS

International Search Report and Written Opinion dated Mar. 18, 2016, for PCT Application No. PCT/US2015/064506, filed Dec. 8, 2015, thirteen pages.
(Continued)

*Primary Examiner* — Emma K Frick
(74) *Attorney, Agent, or Firm* — Morrison & Foerster LLP

(57) ABSTRACT

A joint for a vehicle can direct forces away from an interior of the vehicle and along a frame rail. The joint can pivot when subjected to a high force, and the pivoting action can redirect and redistribute the force away from a passenger compartment. The joint can comprise multiple pivot points.

20 Claims, 28 Drawing Sheets

Related U.S. Application Data

(60) Provisional application No. 62/248,959, filed on Oct. 30, 2015, provisional application No. 62/187,044, filed on Jun. 30, 2015.

(51) Int. Cl.
  *B60K 1/04* (2006.01)
  *B62D 63/02* (2006.01)
(52) U.S. Cl.
  CPC .... *B60K 2001/0438* (2013.01); *B62D 21/157* (2013.01)
(58) Field of Classification Search
  CPC .............. B60K 1/04; B60K 2001/0438; B60K 2001/0472; B60Y 2306/01
  See application file for complete search history.

(56) References Cited

U.S. PATENT DOCUMENTS

| | | | |
|---|---|---|---|
| 5,042,831 A | | 8/1991 | Kuhns |
| 5,476,151 A | * | 12/1995 | Tsuchida ................. B60K 1/00 180/274 |
| 6,227,322 B1 | | 5/2001 | Nishikawa |
| 6,793,248 B1 | | 9/2004 | Sung |
| 6,843,524 B2 | * | 1/2005 | Kitagawa ............. B62D 21/155 180/312 |
| 7,258,392 B2 | * | 8/2007 | Frederick ............. B62D 21/152 296/187.09 |
| 7,393,016 B2 | * | 7/2008 | Mitsui .................... B62D 25/08 180/232 |
| 8,051,934 B2 | * | 11/2011 | Kiya ........................ B60K 1/04 180/274 |
| 8,424,960 B2 | | 4/2013 | Rawlinson et al. |
| 8,459,726 B2 | | 6/2013 | Tyan et al. |
| 8,490,988 B2 | * | 7/2013 | Takeshita ............. B62D 21/155 280/124.109 |
| 8,530,015 B2 | | 9/2013 | Mendiboure et al. |
| 8,657,060 B2 | | 2/2014 | Ohno et al. |
| 8,672,354 B2 | | 3/2014 | Kim et al. |
| 8,696,051 B2 | | 4/2014 | Charbonneau et al. |
| 8,789,634 B2 | | 7/2014 | Nitawaki |
| 8,807,632 B2 | * | 8/2014 | Ramoutar ............... B60R 19/24 293/132 |
| 8,882,150 B2 | | 11/2014 | Yamada et al. |
| 9,067,550 B2 | | 6/2015 | Nagwanshi et al. |
| 9,073,578 B2 | * | 7/2015 | Chikazawa .......... B62D 21/155 |
| 9,096,275 B2 | * | 8/2015 | Yasui .................... B62D 21/11 |
| 9,120,507 B1 | * | 9/2015 | Alwan ................. B62D 21/152 |
| 9,168,883 B1 | | 10/2015 | Midoun et al. |
| 9,187,053 B2 | | 11/2015 | Nusier et al. |
| 9,187,136 B1 | | 11/2015 | Leanza et al. |
| 9,254,872 B2 | * | 2/2016 | Otani .................... B62D 21/155 |
| 9,272,679 B1 | * | 3/2016 | Ramoutar ............. B62D 21/152 |
| 9,346,424 B2 | | 5/2016 | Alavandi et al. |
| 2002/0057004 A1 | | 5/2002 | Corcoran et al. |
| 2006/0061081 A1 | | 3/2006 | Kresse, Jr. et al. |
| 2006/0103169 A1 | | 5/2006 | Anders |
| 2007/0215402 A1 | | 9/2007 | Sasaki et al. |
| 2009/0243336 A1 | | 10/2009 | Honji et al. |
| 2010/0147608 A1 | | 6/2010 | Okabe |
| 2011/0015902 A1 | | 1/2011 | Cheng et al. |
| 2011/0062750 A1 | | 3/2011 | Nakaura et al. |
| 2012/0169089 A1 | | 7/2012 | Rawlinson et al. |
| 2012/0175897 A1 | | 7/2012 | Rawlinson et al. |
| 2013/0069377 A1 | | 3/2013 | Qu et al. |
| 2013/0088044 A1 | | 4/2013 | Charbonneau et al. |
| 2013/0200653 A1 | * | 8/2013 | Yasui ..................... B62D 21/11 296/187.08 |
| 2013/0241237 A1 | | 9/2013 | Dziuba et al. |
| 2014/0291053 A1 | * | 10/2014 | Nagasawa ............ B62D 21/152 180/271 |
| 2014/0338999 A1 | | 11/2014 | Fujii et al. |
| 2015/0353040 A1 | | 12/2015 | Butukuri et al. |
| 2015/0375622 A1 | * | 12/2015 | Yamanaka ............... B60K 1/00 180/65.1 |
| 2016/0039467 A1 | | 2/2016 | Takenaka |
| 2016/0207418 A1 | | 7/2016 | Bergstrom et al. |
| 2017/0001507 A1 | | 1/2017 | Ashraf et al. |
| 2017/0001586 A1 | | 1/2017 | Ashraf et al. |
| 2017/0025655 A1 | | 1/2017 | Klimek et al. |
| 2017/0120951 A1 | | 5/2017 | Ashraf et al. |

FOREIGN PATENT DOCUMENTS

| | | |
|---|---|---|
| JP | 2013-117291 A | 6/2013 |
| WO | WO-2012/117204 A1 | 9/2012 |
| WO | WO-2017/075523 A2 | 5/2017 |
| WO | WO-2017/136351 A2 | 8/2017 |

OTHER PUBLICATIONS

International Search Report dated Apr. 24, 2017, for PCT Application No. PCT/US2016/059564, filed Oct. 28, 2016, eight pages.
International Search Report dated May 16, 2017, for PCT Application No. PCT/US2017/015857, filed Jan. 31, 2017, three pages.
Non-Final Office Action dated Feb. 9, 2017, for U.S. Appl. No. 14/840,741, filed Aug. 31, 2015, 13 pages.
Final Office Action dated Aug. 25, 2017, for U.S. Appl. No. 14/840,741, filed Aug. 31, 2015, ten pages.
Non-Final Office Action dated Feb. 1, 2018, for U.S. Appl. No. 15/015,034, filed Feb. 3, 2016, 7 pages.
Final Office Action dated May 21, 2018, for U.S. Appl. No. 14/840,741, filed Aug. 31, 2015, eleven pages.
Non-Final Office Action dated Jun. 8, 2018, for U.S. Appl. No. 15/078,871, filed Mar. 23, 2016, eight pages.
Notice of Allowance dated Jun. 13, 2018, for U.S. Appl. No. 15/015,034, filed Feb. 3, 2016, five pages.

* cited by examiner

JOINT FOR AN UNDERBODY OF A MOTOR VEHICLE

CROSS-REFERENCES TO RELATED APPLICATIONS

The present application is a continuation-in-part and claims priority to: 1) U.S. patent application Ser. No. 15/078,871, filed on Mar. 23, 2016, which in turn claims the benefit of U.S. Provisional Patent Application No. 62/248,959, filed on Oct. 30, 2015; and is a continuation-in-part of and claims priority to 2) U.S. patent application Ser. No. 14/840,741, filed on Aug. 31, 2015, which in turn claims the benefit of U.S. Provisional Patent Application No. 62/187,044, filed on Jun. 30, 2015, the entire disclosures of which are hereby incorporated by reference in their entirety for all intended purposes.

FIELD OF THE DISCLOSURE

The present disclosure relates generally to an automobile frame and, more particularly, but not by way of limitation, to a joint of an underbody frame for electric and other motor vehicles.

BACKGROUND

Vehicles such as cars, vans, trucks and buses can be constructed on a supporting structure known as a frame, chassis or underbody. In a body-on-frame design, the frame is separate from the body of the vehicle and components of the vehicle such as the engine, drivetrain and body are coupled to the frame. In contrast, the body and frame are at least partially integrated with one another in uni-body construction. The frame can comprise a plurality of rails, beams, tubes and other structural members coupled together to form a load bearing structure.

SUMMARY

The present disclosure can be directed to a joint for a vehicle. An exemplary joint can comprise a body member coupled to a vehicle underbody at a first mounting point and at a second mounting point. Each of the first and second mounting points can further comprise a pivot point for the body member. A vehicle rail can be couple to the body member at one or more locations other than the first and second mounting points. The body member can be pivotable at one of the first and second mounting points when a force is applied to the body member. The pivoting movement of the body member can at least partially transfer the force to the vehicle rail.

According to additional exemplary embodiments, the present disclosure can be directed to a joint for a vehicle. An exemplary joint can comprise a body member having a longitudinal axis. The body member can comprise a first mounting hole and a second mounting hole disposed on one side of the longitudinal axis. A first connecting device can be positioned within the first mounting hole and can be operative to couple the body member to the vehicle frame. The first mounting hole and the first connecting device can form a first pivot point. A second connecting device can be positioned within the second mounting hole and can be operative to couple the body member to the vehicle frame. The second mounting hole and the second connecting device can form a second pivot point. The body member can pivot at one of the first or second pivot points when a force is applied in a first direction to the body member such that the force is redirected in a second direction different than the first direction.

According to further exemplary embodiments, the present disclosure can be directed to an underbody for a vehicle. An exemplary underbody can comprise a cross member, a center frame section, and a webbing member. The cross member and the center frame section can be coupled to the webbing member such that the cross member, the center frame section, and the webing member at least partially define a passenger compartment. A joint can be coupled to the webbing member. The joint can comprise a body member having two pivot points at which the body member is pivotable in relation to the webbing member. A vehicle rail can be coupled to the joint such that the vehicle rail is essentially parallel to and spaced apart from the center frame section. The body member can be pivot at one of the two pivot points when a force is applied to the joint, thereby transferring at least a portion of the force to the vehicle rail and away from the passenger compartment.

BRIEF DESCRIPTION OF THE DRAWINGS

Certain embodiments of the present disclosure are illustrated by the accompanying figures. It will be understood that the figures are not necessarily to scale and that details not necessary for an understanding of the technology, or that render other details difficult to perceive, may be omitted. It will be understood that the technology is not necessarily limited to the particular embodiments illustrated herein.

DETAILED DESCRIPTION

Figure 1:
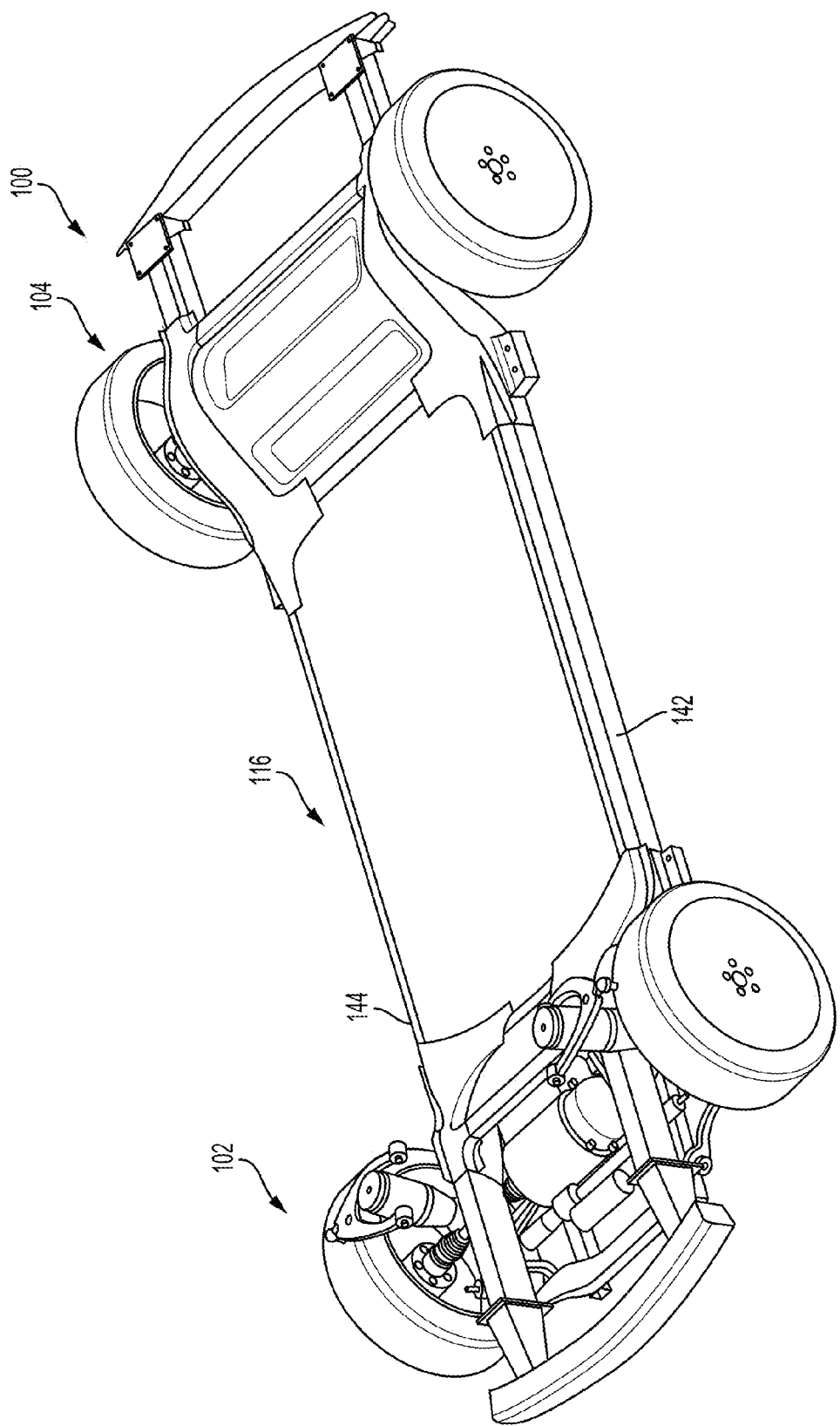
FIG. 1 is a perspective view of an underbody structure for the present disclosure according to an exemplary embodiment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The present disclosure provides exemplary underbody structures for motor vehicles. The underbody structure is also referred to as an underbody, a skateboard, or a chassis herein. In various embodiments, the underbody can form a hybrid uni-body with the upper body of the motor vehicle. Exemplary underbodies can provide an adaptable platform for accommodating different motor vehicle sizes and different vehicle upperbodies. The underbody of the present disclosure can enhance overall vehicle safety, for example, by having the battery pack centralized in the vehicle in various embodiments, resulting in greater crumple zone performance around the battery pack compared to existing vehicle designs. In addition, various embodiments of the underbody can, for example, provide for scalability to readily adapt to new vehicle platforms and provide for improved vehicle handling (yaw acceleration).

Provided are various embodiments of an underbody for a motor vehicle. The motor vehicle can be an electric vehicle, however, the present disclosure is not limited to use in electric vehicles. In various embodiments, the underbody can be configured to form a hybrid uni-body with the upper body and/or configured for use in multiple vehicle product lines, accommodating vehicles of various sizes having various upper bodies.

In some embodiments, a length of the adaptable platform can vary by increasing or reducing the length of certain structures between the front rails and the rear rails of the underbody.

In some embodiments, the width of the adaptable platform can vary by increasing or reducing the width of certain structures between the left side and right side that meets with an upper body of the vehicle.

The size of the battery can be selectively modifiable by virtue of a modular battery design.

The underbody can enhance overall vehicle safety, for example, due to having the battery being centralized in the vehicle, allowing for greater crumple zones around the battery compared to existing vehicle designs.

An upper portion (e.g., cover) of the battery enclosure can form all or part of a floor portion (assembly) of a passenger compartment of the motor vehicle. In some embodiments, the floor portion can be separate from the upper portion. An exemplary floor portion can extend longitudinally between a front section and a rear section of the battery cover. In some embodiments, an additional plate or panel can be included in the underbody that can separately, or together with the upper portion, form the floor portion of the passenger compartment. Additional cross members can be included to provide additional structural support.

Since the underbody according to various embodiments can function as the floor portion of the passenger compartment, the passenger compartment is not required to be completely separated from the underbody.

Other example embodiments of the disclosure and aspects will become apparent from the following description taken in conjunction with the following drawings.

Figure 2:
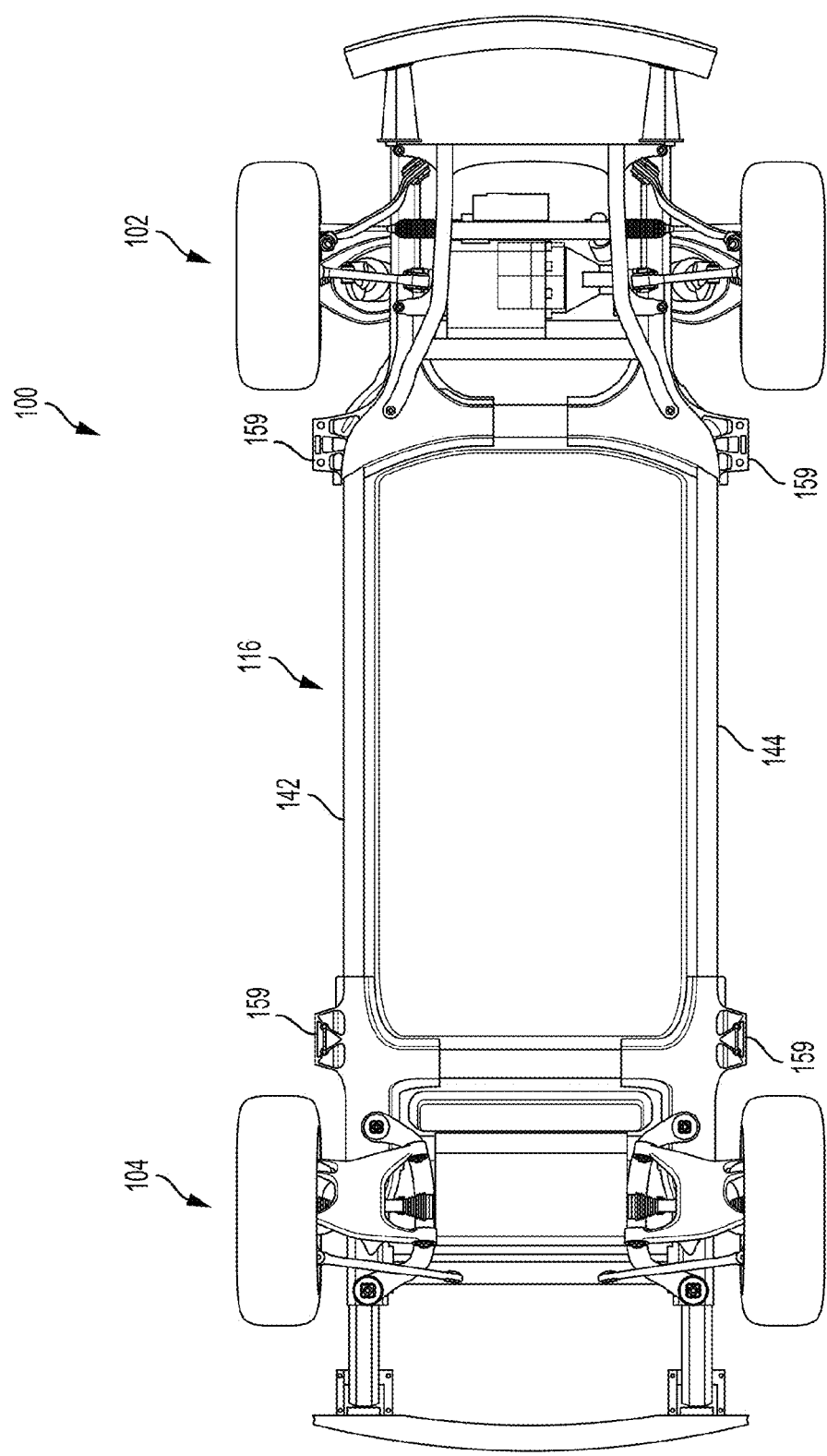
FIG. 2 is a top plan view of the underbody structure of FIG. 1.

FIGS. 1 and 2, collectively illustrate an example underbody 100. FIG. 1 is a perspective view of the example underbody 100 that is constructed in accordance with the present disclosure. Generally, the underbody 100 can include a front end 102, a rear end 104, a battery subassembly 106 (see FIG. 3), as well as other additional or fewer components as will be described in greater detail herein.

The front end 102 and rear end 104 can be spaced apart from one another by a middle section 116. The middle section 116 can include a left center frame section 142 and a right center frame section 144.

The underbody 100, in some embodiments, can be constructed from various materials or a single material. The material(s) utilized in the underbody 100 will be described with reference to each of the components or sub-assemblies of the underbody 100.

In general, the underbody 100 can be configured to cooperate with an upper body, as will be described in greater detail below. A common design for vehicles involves the use of body-on-frame technology, where a frame is coupled with the engine, drivetrain, portions of the vehicle's suspension system, and wheels of the vehicle. The remaining portions of the vehicle, referred to as the upper body, are joined to the frame. Safety, comfort, and aesthetic components of the vehicle are found in the upper body, such as seats. Having the seats mounted to the frame can increase the safety of the vehicle by providing the seats with a more substantial and connected relationship with the underbody of the vehicle. Indirect mechanical connections between the seat, the body, and ultimately the frame serve to reduce these features.

Also, in a traditional body-on-frame vehicle, the frame comprises a skeleton of tubular frame members, where the drivetrain (e.g., drive shaft) traverses/extends the length of the frame, which necessitates having a frame that is typically divided into a right handed section and a left handed section. These sections are then joined through the use of cross members.

Advantageously, the present disclosure provides an underbody 100 with a middle portion 116 that can be continuous from a right hand side of a frame to a left hand side of the frame, which can increase a resistance of the underbody 100 to twisting during impact.

Thus, the underbody designs of the present disclosure can benefit from the strength and stability of the monocoque (i.e., vehicle structure in which the chassis is integral with the body) design, but provide greater flexibility by allowing various body components to be placed onto the underbody 100, such as the outer panels of the upper body.

Figure 3:
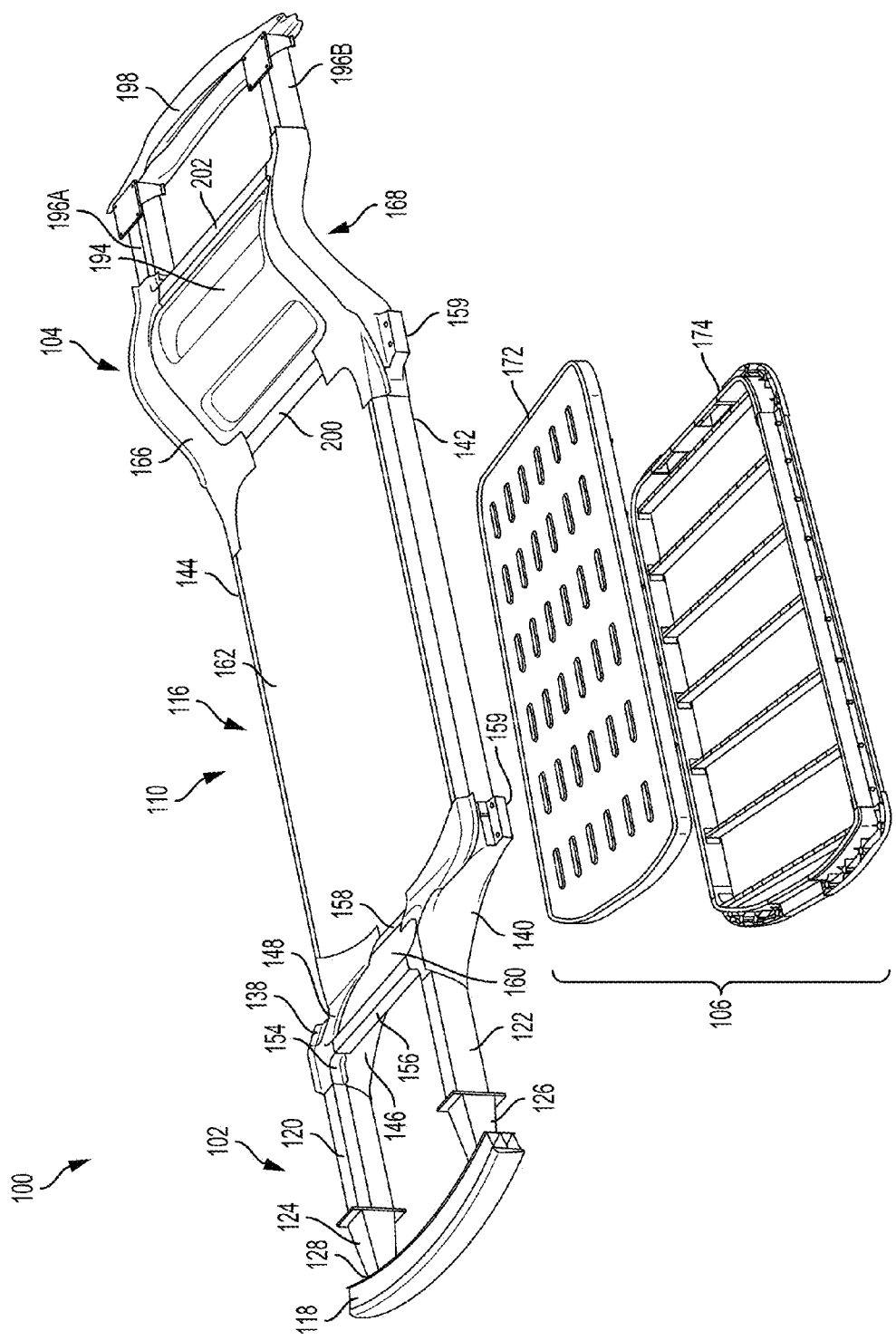
FIG. 3 is an exploded perspective view of the underbody structure, in combination with a battery sub-assembly.
Figure 9A:
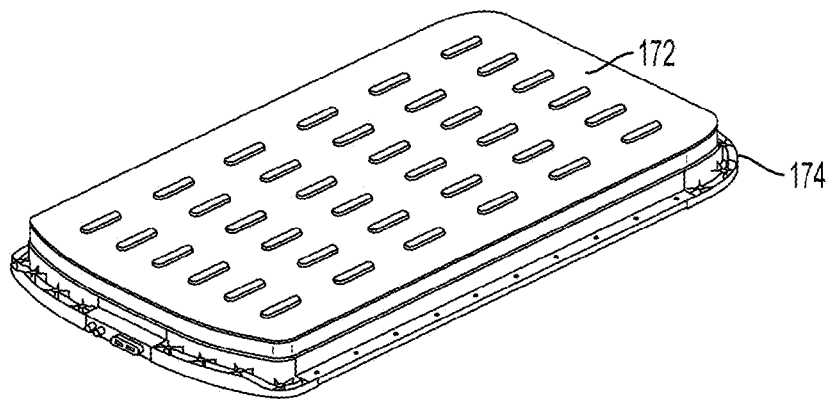
FIG. 9A is a perspective view of an exemplary battery sub-assembly.
Figure 9B:
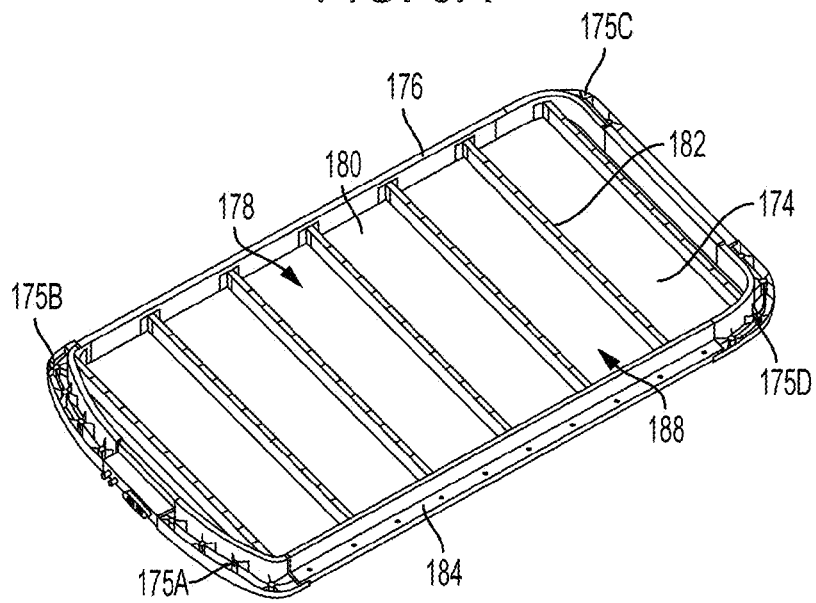
FIG. 9B is a perspective view of a body of the exemplary battery sub-assembly.
Figure 9C:
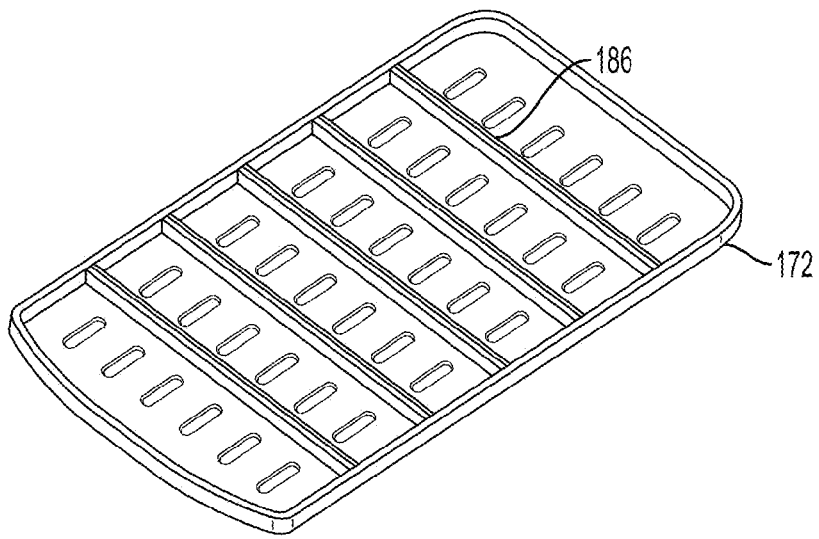
FIG. 9C is a perspective view of a cover of the exemplary battery sub-assembly.
Figure 10:
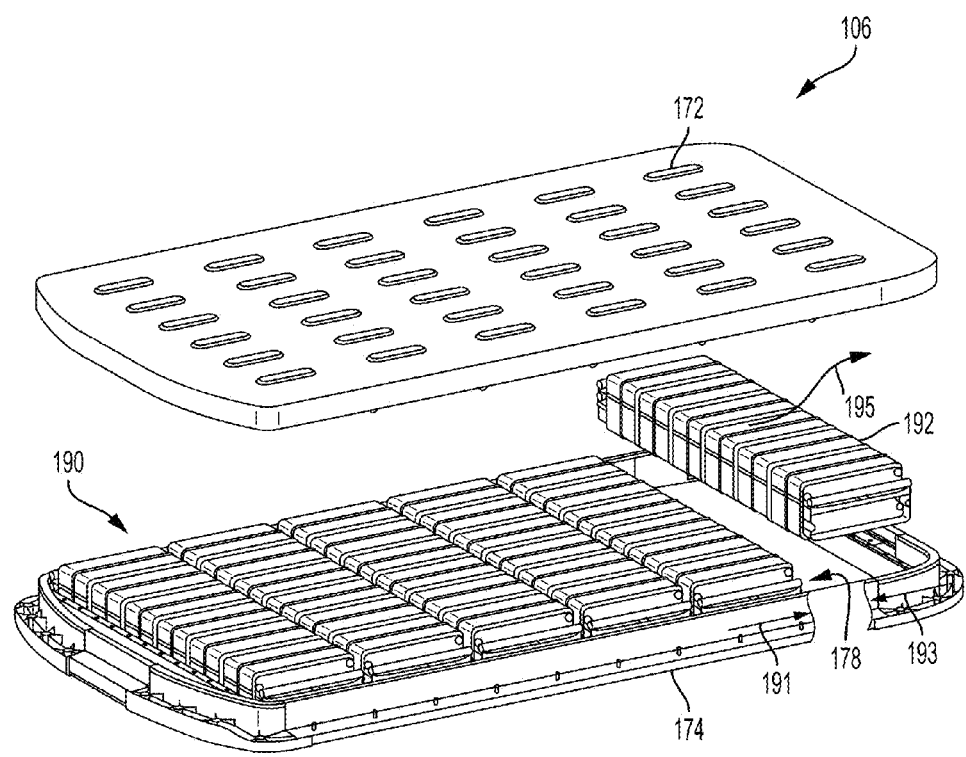
FIG. 10 is an exploded perspective view of the exemplary battery sub-assembly.

FIG. 3 is an exploded view of the underbody 100 that includes an outer peripheral frame 110 that illustrates a battery cover 172 and a body 174 (see FIGS. 9A-C) that holds the battery pack (see 190 in FIG. 10).

Figure 4:
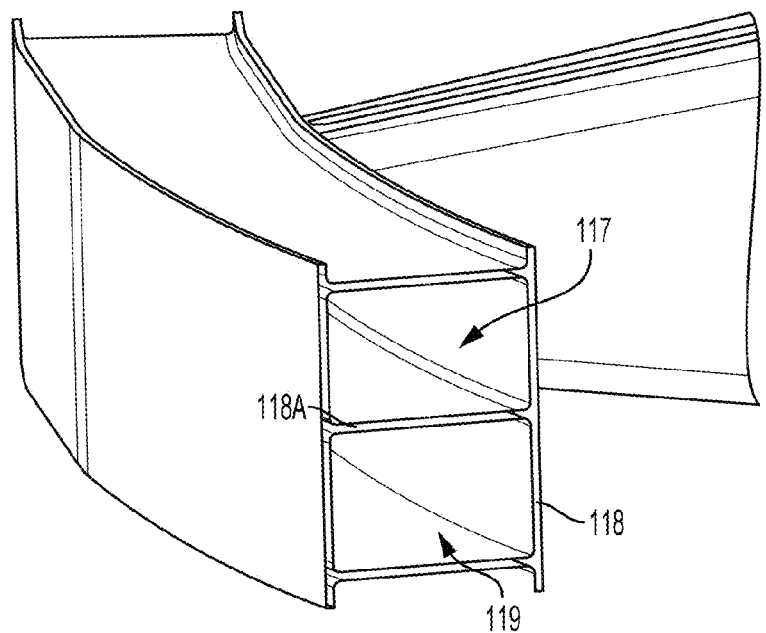
FIG. 4 is a cross sectional view of a front bumper of the underbody structure.

Turning now to FIGS. 3-6 collectively, described from front end 102 to rear end 104, the underbody 100 can comprise a front bumper 118. The front bumper 118 can be constructed from a cold rolled metal such as aluminum or an aluminum alloy in some embodiments, but any structurally strong material could be used including steel, titanium, composite materials, thermoplastic polymers, carbon fiber, and other structural materials known in the art. As illustrated in FIG. 4, the front bumper 118 can comprise a divider web 118A that separates the front bumper 118 into two sections, an upper section 117 and a lower section 119. The front bumper 118 can have a substantially tubular cross sectional area. In one embodiment, the front bumper 118 can have a substantially arcuate shape.

The front bumper 118 can be coupled with a pair of rails, such as first rail 120 and second rail 122. Connecting the front bumper 118 with the pair of rails can be the first crush can 124 and the second crush can 126.

Each of the rail crush cans 124 and 126 can be constructed similarly to one another and can be constructed from a sheet metal such as aluminum. In some embodiments, the crush cans 124, 126 can be made by casting or hydroforming. In one embodiment the first rail crush can 124 can have a substantially conical shape with flat outer face panel sections. Terminating one end of the first rail crush can 124 can be a mounting plate 128 that has an arcuate shape that conforms to an arcuate curvature of the front bumper 118. Again, the second rail crush can 126 can be constructed to form a complimentary mount for the second rail 122. It should be understood that other suitable mechanisms for coupling the front bumper 118 with the rails 120, 122 can also be adopted in other embodiments.

Figure 5:
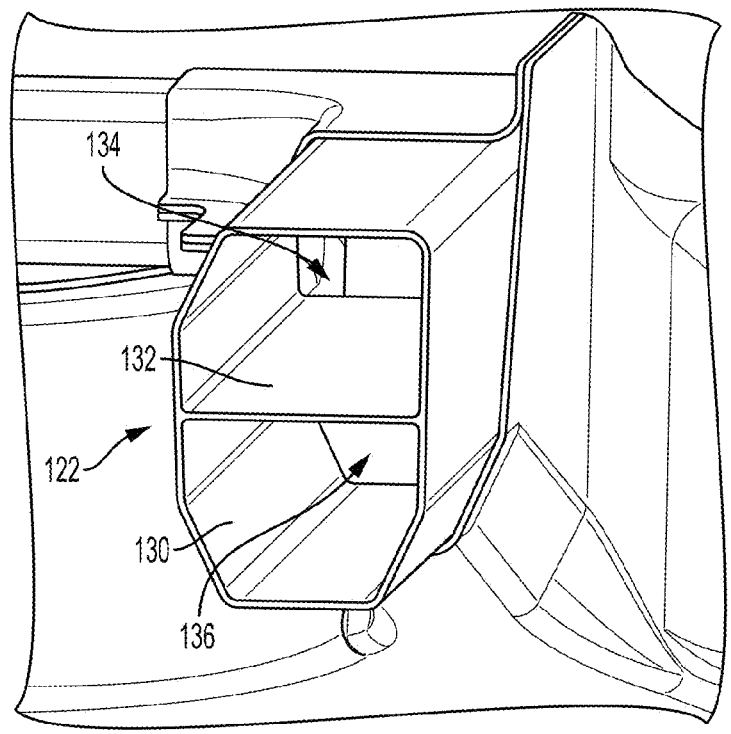
FIG. 5 is a cross sectional view of a front end rail of the underbody structure.

The first rail 120 and second rail 122 can be constructed similarly (e.g., as mirror images of each other) to one another and thus the second rail 122 will be described in greater detail with reference to FIG. 5. The second rail 122 can be a substantially tubular length of an extruded metal such as aluminum. The second rail 122 can have various angled surfaces, such as angled surface 130, which can be altered according to design requirements such as desired crumple strength and motor sizing, for example. The second rail 122 can have a divider web 132 that provides structural support and divides the second rail 122 into an upper section 134 and lower section 136.

The underbody 100 can comprise frame transition sections, such as first transition section 138 and second transition section 140. The first and second transition sections 138 and 140 can be complementary (e.g., right handed, left handed) components. The first and second transition sections 138 and 140 can provide a narrowing connection between the left center frame section 142 and the right center frame section 144 (also illustrated in FIGS. 1 and 2).

For brevity and clarity, only the first transition section 138 will be described in detail. The first transition section 138 can comprise a lower segment 146 and an upper segment 148. The lower segment 146 can be manufactured from a high pressure die cast metal, such as aluminum. The lower segment 146 can be a high strength component that provides a compression point upon which the first and second rails 120 and 122 can crumple against.

Figure 6:
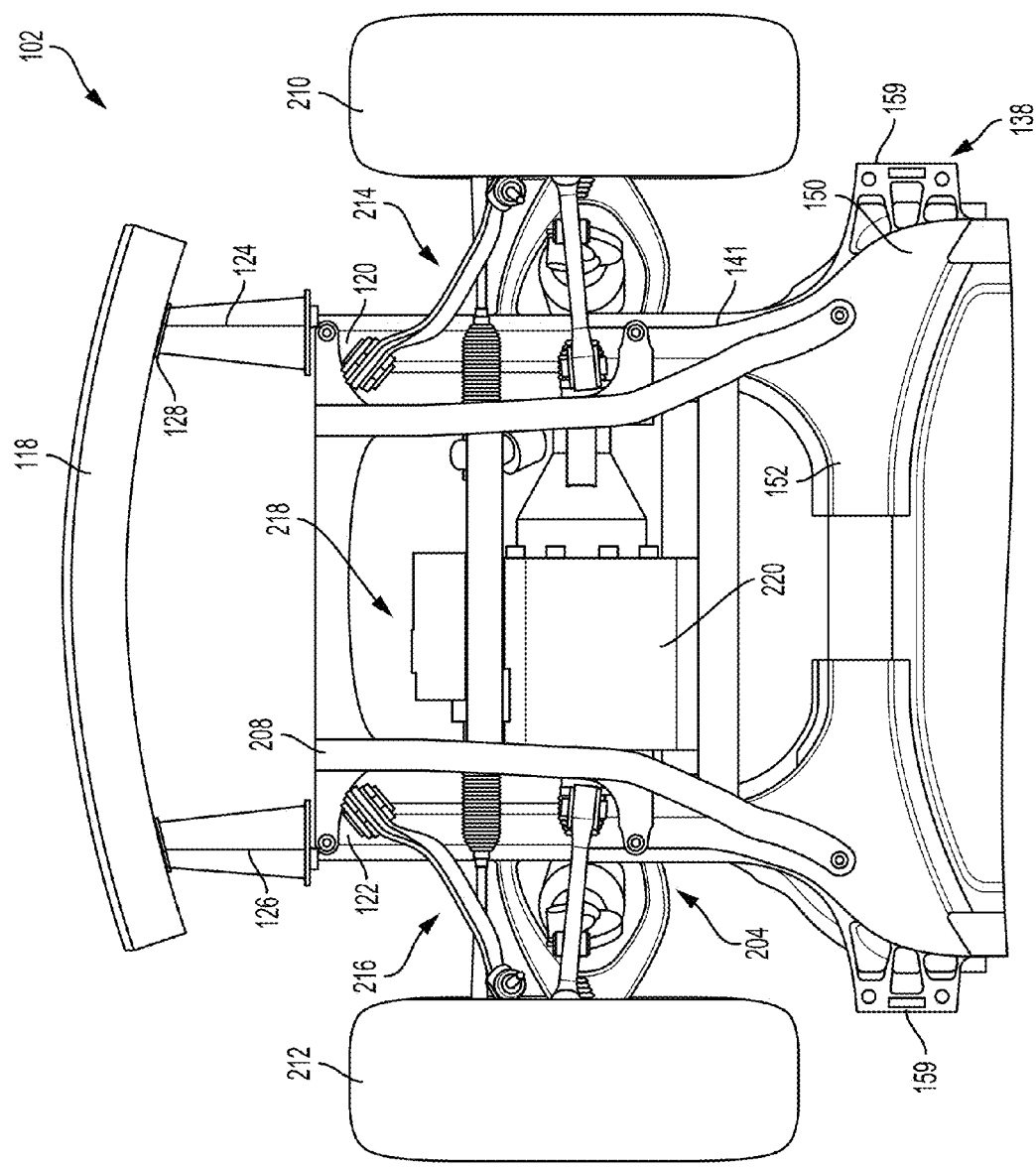
FIG. 6 is a bottom view of a front end of the underbody structure.

As illustrated in FIG. 6, the first transition section 138 can have a substantially T-shaped configuration with a rail coupling portion 141 and a frame section coupling portion 150. A transition tie section 152 can provide a mounting position for a front cross member, which is described below. Again, the second transition section 140 can have a similar, but complementary shape to first transition section 138.

In FIG. 3, the upper segment 148 of the first transition section 138 can cooperate with the lower segment 146 and include an opening 154 that receives a first front cross member 156 that ties the first transition section 138 and the second transition section 140 together, providing structural rigidity and stability to the underbody 100. The transition sections of the underbody 100 can be referred to as frame nodes. These frame nodes can provide structural rigidity and anchoring for the rails of the underbody 100.

A second front cross member 158 can extend between the first transition section 138 and the second transition section 140 for additional structural support. The upper segment 148 can include one or more sections and be configured to receive a front panel 160 that extends between the first transition section 138 and the second transition section 140 and the first and second front cross members 156 and 158. The front panel 160 can be manufactured from structurally rigid foam such as aluminum foam sandwich material.

The left center frame section 142 and the right center frame section 144 can extend between the front end 102 and the rear end 104. Extending between the left center frame section 142 and the right center frame section 144 can be a middle panel 162. The middle panel 162 can be manufactured from a structurally rigid foam such as aluminum foam sandwich material. The vehicle's passenger compartment is not required to be completely separated from the underbody 100 according to various embodiments. For instance, the cover 172 of the battery sub-assembly 106 can be the middle panel 162, such that the cover 172 can form a floor section extending longitudinally along the middle section 116. In other embodiments, the cover 172 of the battery sub-assembly 106 can be coupled, from below, to a separate middle panel 162, the combination forming a floor section of the vehicle.

Figure 7:
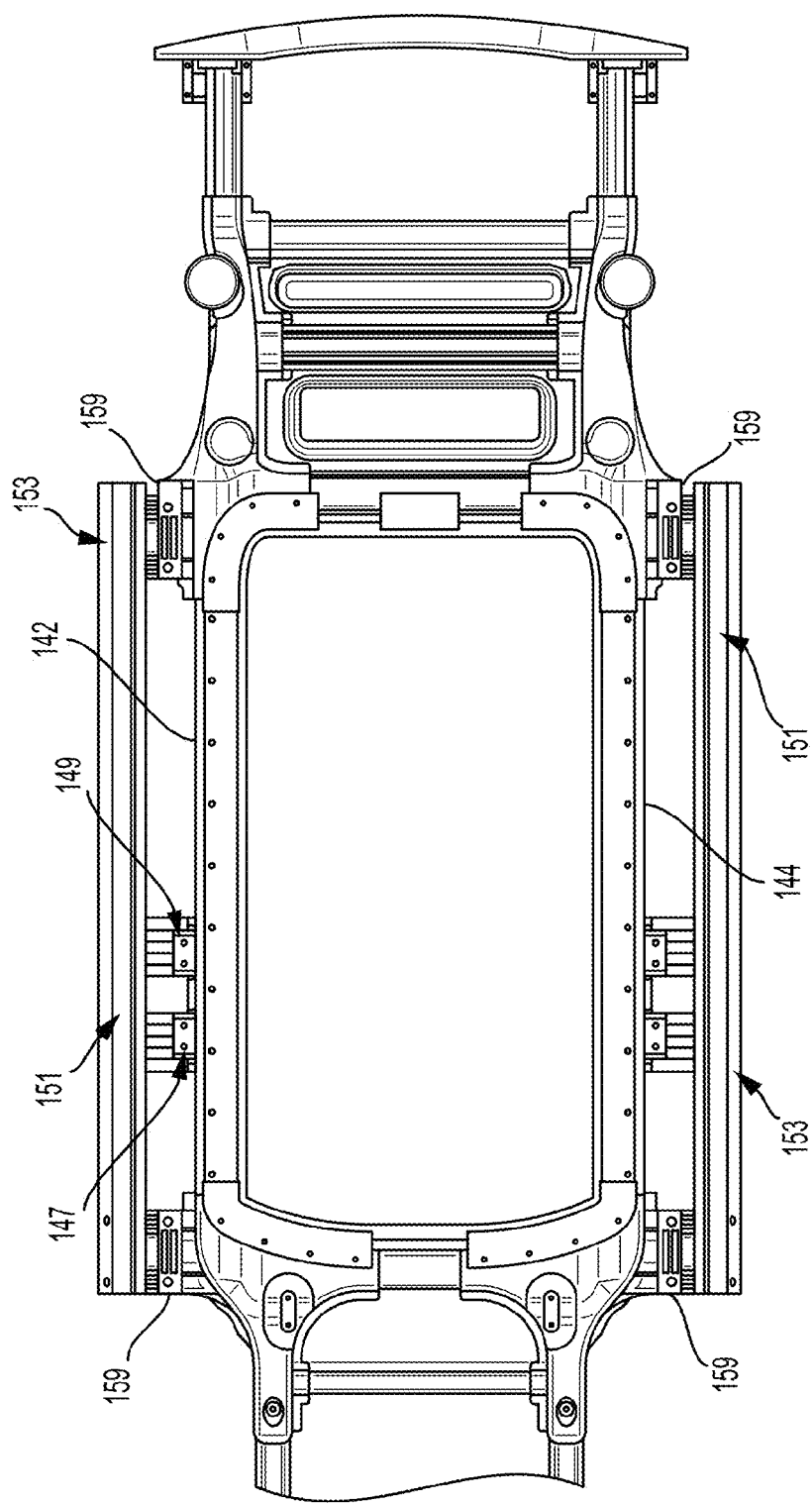
FIG. 7 is a bottom view of the underbody structure illustrating mounting rails of an exemplary upper body attached.
Figure 13:
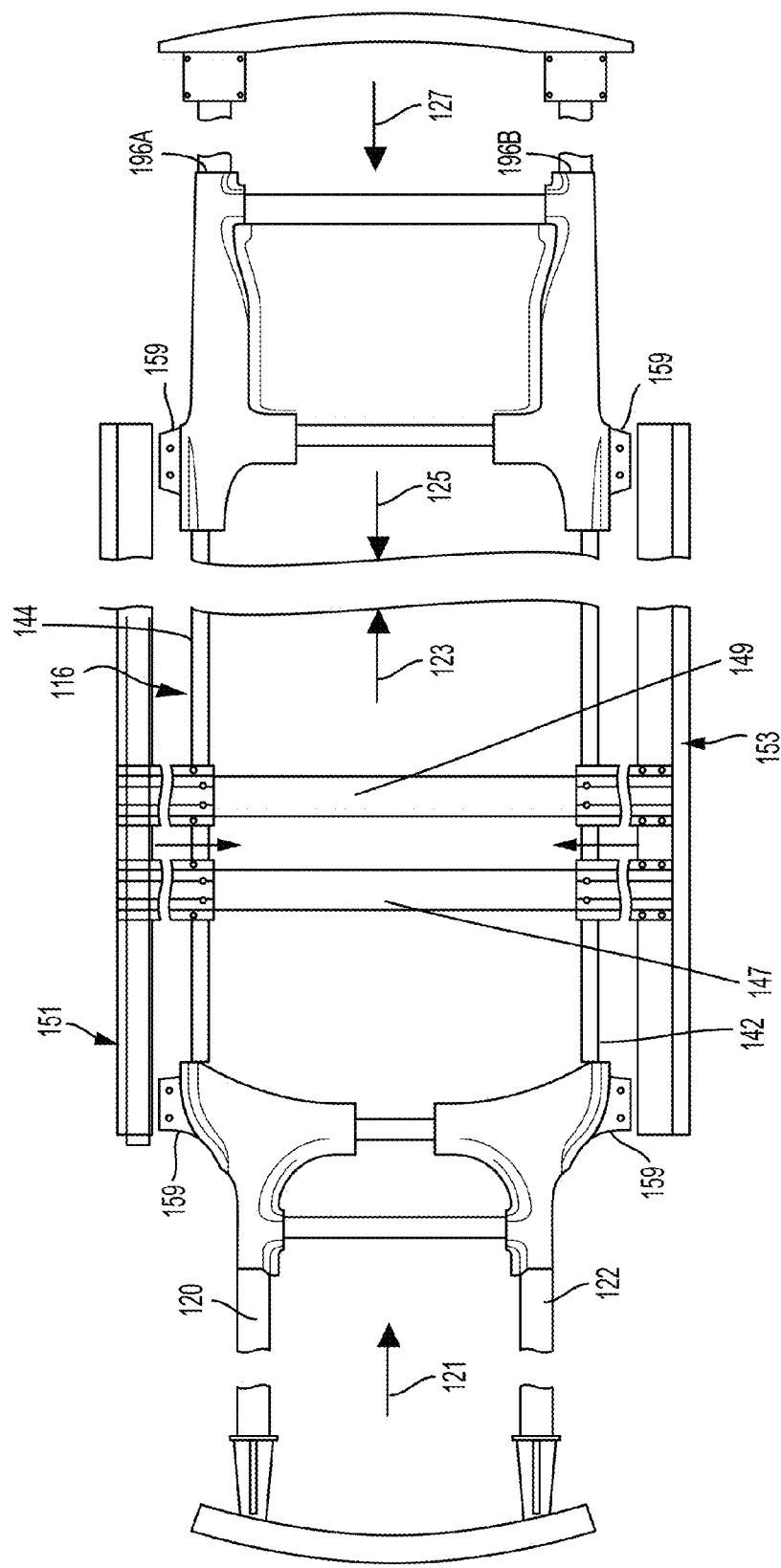
FIG. 13 is a top view of the exemplary underbody structure that illustrates various size configurable portions of the underbody structure that allow the underbody structure to be configured to accommodate various sizes of upper bodies of motor vehicles (with mounting rails of an exemplary upper body, that would attach to the underbody structure, also shown in this example).

The underbody 100 can also comprise one or more support members, such as middle support members 147 and 149 (see FIG. 13). These middle support members 147 and 149 can extend between the left center frame section 142 and the right center frame section 144 and provide yet additional structural rigidity to the underbody 100. Each of the members 147, 149 can comprise mounting brackets that join the member 147, 149 to the upper body sills 153. As illustrated in FIG. 7, in some embodiments, each of the mounting brackets can comprise joints 159 that couple the middle support members 147 and 149 with upper body rails, which are described in greater detail below.

Various embodiments can provide structural stability to the underbody 100 reducing frame twisting and bending, which can occur during impact events. For example, if the underbody 100 is impacted at a the rear right corner, the impact force can apply a twisting or torque force onto the underbody 100 as the wheels on the front end 102 tend to remain in contact with the road.

Referring again to FIG. 3, disposed along the left center frame section 142 and the right center frame section 144 can be a plurality of joints 159 that allow any upper body to be coupled with the underbody 100. Examples of the joints 159, for anchoring the upper body (not shown) to the underbody 100, are also shown in FIG. 7.

Figure 8A:
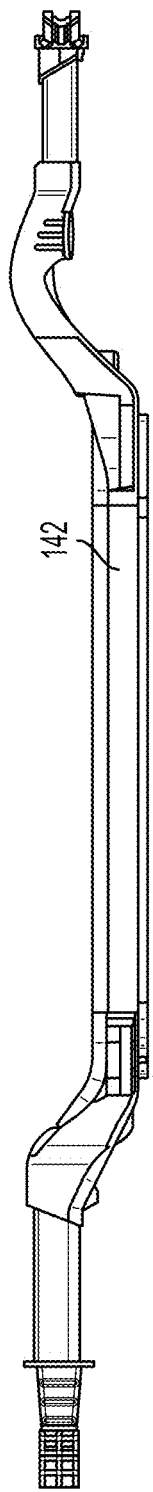
FIG. 8A is a side view of the underbody structure.
Figure 8B:
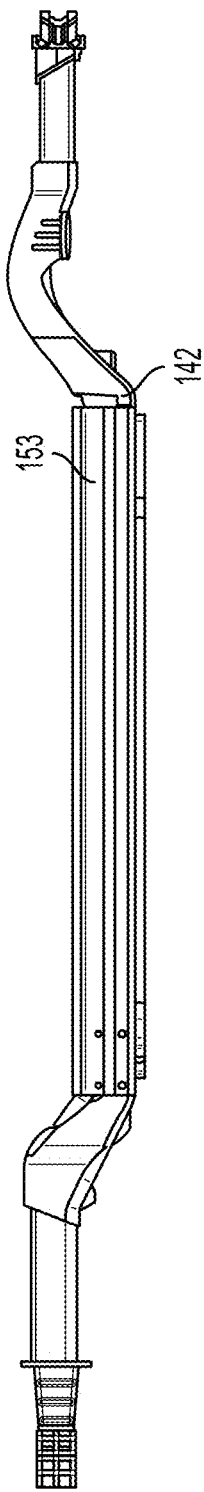
FIG. 8B is a side view of the underbody structure with exemplary upper body mounting rails attached.

In FIGS. 8A and 8B, upper body sills, such as upper body sill 153, can be joined to the left center frame section 142 and the right center frame section 144 (sections 142 illustrated in FIG. 3). For example, upper body sill 153 can be joined to right center frame section 144. The upper body sill 153 can couple the upper body (not shown) to the underbody 100 in some embodiments.

Referring back to FIG. 3, the first transition section 138 and the second transition section 140 can cooperate with the left center frame section 142 and the right center frame section 144, as well as a third transition section (node) 166 and a fourth transition section (node) 168 of the rear end 104 to form a sidewall creating a cavity for receiving a portion of the battery sub-assembly 106 therein.

An example battery sub-assembly 106 is illustrated in FIGS. 9A-C. An assembled version of the battery sub-assembly 106 is provided in FIG. 9A. A cover 172 is illustrated in combination with a body 174.

FIG. 9B illustrates the exemplary battery sub-assembly 106 with the cover 172 removed. The body 174 can be defined by a sidewall 176 that forms a cavity 178 with a lower portion 180 of the body 174. The sidewall 176 can include corner braces 175A-D, which can be manufactured using a casting process, whereas the remainder of the sidewall 176 can be manufactured from extruded metal sections.

Extending between left and right sections of the sidewall 176 can be support ribs, such as support rib 182. The support ribs 182 can lie transversely across the lower portion 180. In some embodiments, the body 174 can be provided with a flange or step 184 that allows the battery sub-assembly 106 to be coupled with the outer peripheral frame (see for example FIGS. 3 and 7). Thus, the battery sub-assembly 106 can be installed into the opening of the outer peripheral frame (see for example FIGS. 3 and 7).

The cover 172 of the battery sub-assembly 106 can also be provided with support ribs such as support rib 186. These support ribs 186 can form seals sealing the individual battery strings from each other when positioned against the support ribs 182 of the lower portion 180 of the body 174. Optionally, the support ribs 186 can also provide structural support to the cover 172.

In some embodiments, the support ribs 182 of the body 174 and the support ribs 186 of the cover 172 can cooperate to form battery channels, such as battery channel 188. The battery channel 188 can be configured to receive a battery cell stack which can be a stack or string of individual battery modules, as will be described in greater detail below.

Turning now to FIG. 10, a battery pack 190 can include an array of battery strings or segments, such as battery cell stack 192 (also referred to as battery cell string or battery string). The battery cell stack 192 can include a string of battery modules (see exemplary module in FIG. 11).

It will be understood that the size of the battery pack 190 can be selectively controlled by removing or adding battery segments 192. As the size of the battery 190 changes, the configuration of the underbody 100 can change. For example, the lengths of the left center frame section 142 and the right center frame section 144 can be lengthened or shortened according to design requirements. The arrow 195 illustrated in the example in FIG. 10 references the removal of a battery cell stack 192 to compress the size of the battery pack 190. Arrows 191 and 193 reference the removal of a battery channel 178 to compress the size of the body of the battery sub-assembly accordingly.

Figure 11:
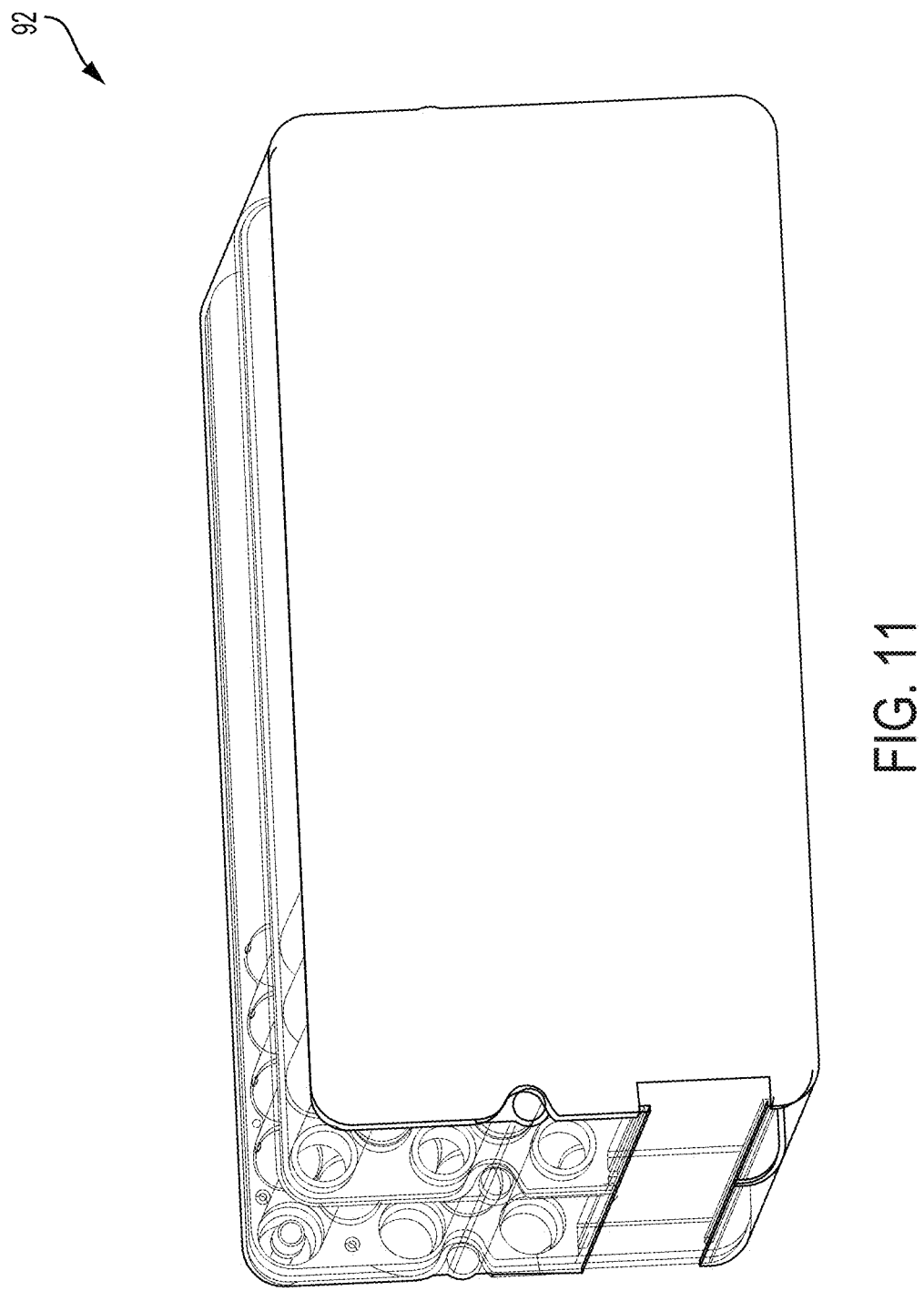
FIG. 11 is a perspective view of a portion of an exemplary battery module.

FIG. 11 illustrates a module 92 of the exemplary battery cell stack 192 (see FIG. 10).

Figure 12:
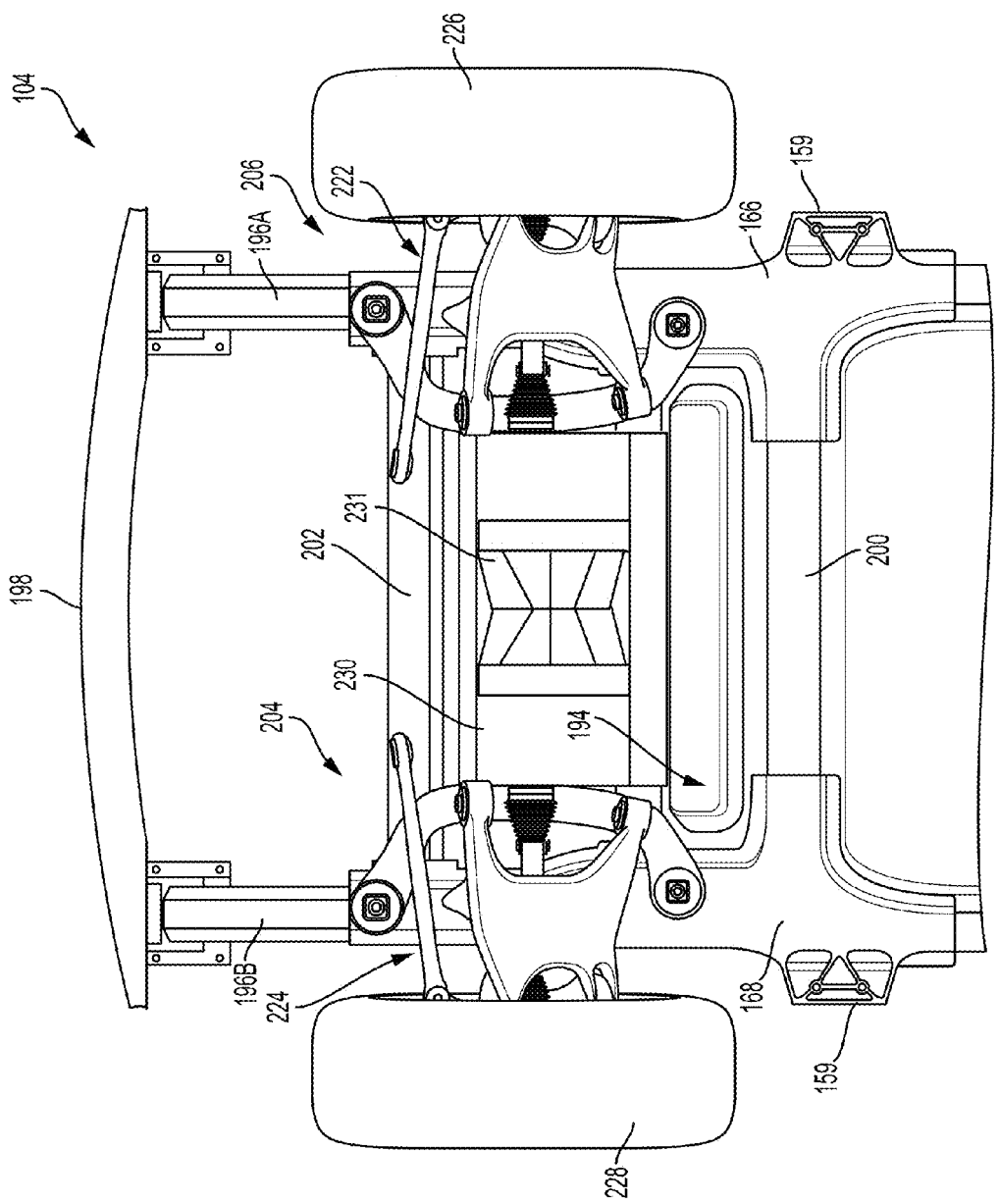
FIG. 12 is a bottom view of a rear end of the exemplary underbody structure.

Referring now to FIGS. 3 and 12 collectively, the rear end 104 of the underbody 100 is illustrated as comprising a rear structural panel 194, the third transition section 166, the fourth transition section 168, as well as a pair of rear bumper rails 196A and 196B, and a rear bumper 198.

The rear structural panel 194 can be manufactured from an aluminum foam sandwich material or a rolled panel of metal. The rear structural panel 194 can be bounded by the third transition section 166 and the fourth transition section 168, as well as a first rear cross member 200 and a second rear cross member 202. FIG. 12 illustrates an upward view of the bottom of the rear end 104, which illustrates the rear structural panel 194, which can be configured to accommodate a rear drive assembly 204. Additional details regarding rear and front drive assemblies 204 and 206 will be described with reference to FIGS. 6 and 12 in greater detail below.

The rear bumper rails 196A and 196B can be constructed similarly to the first and second rails 120 and 122 of the front end 102 and cooperatively engage the rear bumper 198. The rear bumper 198 can comprise an arcuate configuration and can be tubular in its cross section, similarly to the front bumper 118 of the front end 102.

FIG. 13 is a top plan view illustrating various features of an exemplary adaptable platform that includes an exemplary underbody structure that can be selectively adjusted in size to accommodate upper bodies of differing sizes. In addition to showing an exemplary underbody 100, FIG. 13 also shows sills 151 and 153 which are part of an exemplary upper body. The adaptable platform can provide adaptability of the underbody 100 for use in the assembly of multiple vehicle product lines. The adaptable platform (also referred as a "skateboard" platform) can accommodate vehicles of various sizes having various upper bodies. The length of the adaptable platform can vary by increasing or reducing the length of certain structures between the front rail and the rear rail, as illustrated by arrows 121, 123, 125, and 127 in the example in FIG. 13. For example, the first and second rails 120 and 122 can be selectively lengthened or shortened, as well as the rear bumper rails 196A and 196B. The size of the middle section 116 of the underbody 100 can be shortened or lengthened as needed. In some embodiments, the width of the adaptable platform can vary by increasing or reducing the width of certain structures. The size of the battery sub-assembly 106 can be changed, along with other underbody structures for accommodating different motor vehicle sizes and different vehicle upper bodies. The change in size to the battery sub-assembly 106 can require removing or adding one or more battery channels, such as battery channel 188 of FIGS. 9A-C, and corresponding change in the configuration of the battery pack 190. To be sure, these components can be sized independently from one another depending on design requirements.

Turning back to FIG. 6, the front end 102 can be configured to receive the front drive assembly, which in some embodiments can include a subframe 208 that can be mechanically coupled to the first and second rails 120 and 122, as well as the first and second transition sections 138 and 140, respectively. Wheels 210 and 212 can be supported on the front end 102 with a suspension assembly that comprises suspension sub-assembly 214 and 216, which couple wheels 210 and 212, respectively to the underbody 100. In the example in FIG. 6, the wheels 210 and 212 of the vehicle can be coupled to a front power plant 218 that can comprise an electric motor 220.

FIG. 12 illustrates the rear drive assembly 204 comprising a rear suspension assembly having rear suspension sub-assemblies 222 and 224, which are coupled to the wheels 226 and 228, respectively, with the underbody 100. The rear drive assembly 204 can comprise a rear power plant 230, which can also comprise one or more electric motors 231.

Figure 14:
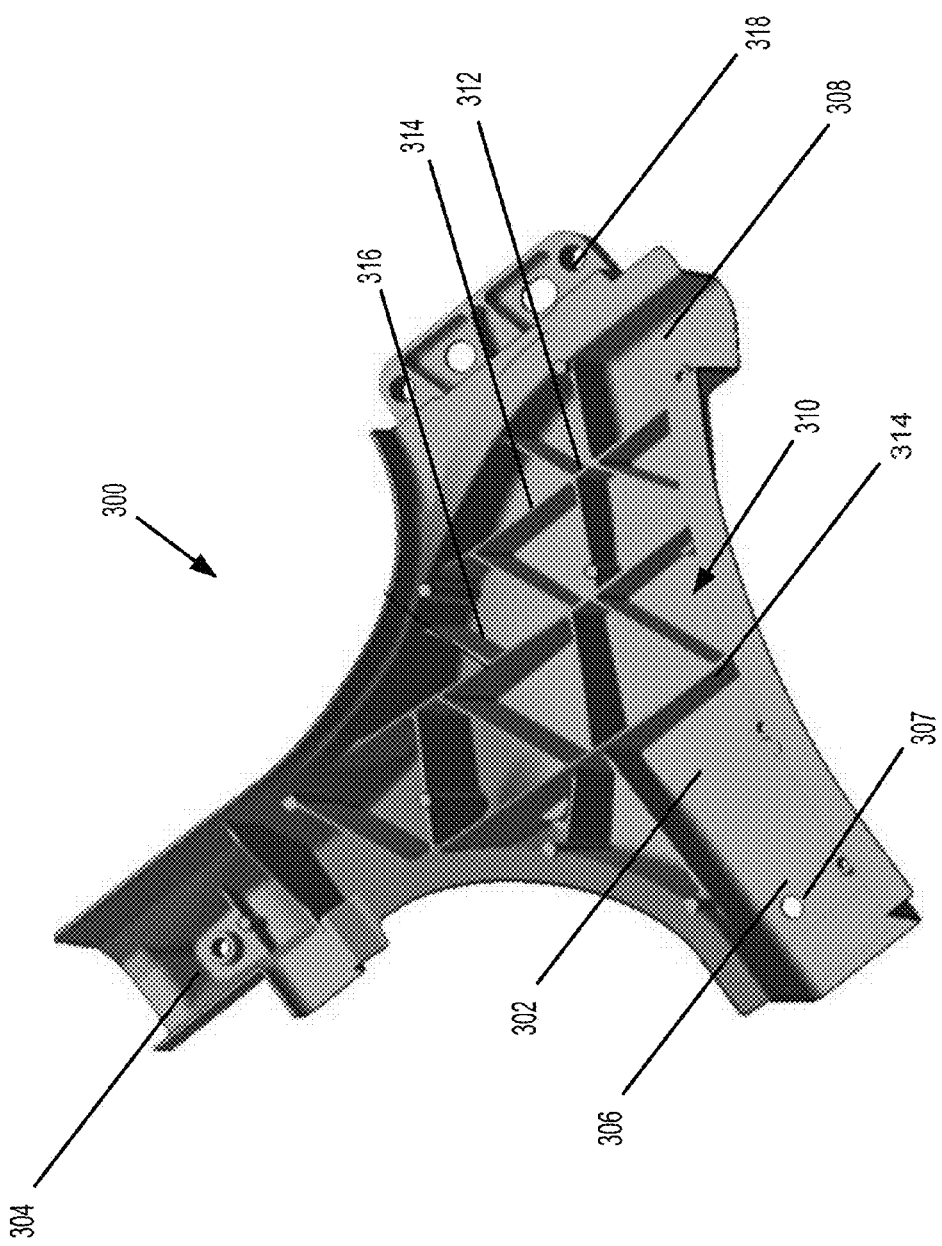
FIG. 14 is a perspective view of an exemplary webbing device for use with vehicle underbodies.

According to some embodiments, the underbody 100 can comprise a webbing device 300, as illustrated in FIG. 14. The webbing device 300 can comprise a body panel 302 shaped to comprise a front end rail channel 304, a front cross member channel 306, and a center frame section channel 308. In various embodiments, the cross member channel 306 can be oriented essentially perpendicular to the center frame section channel 308, and the front end rail channel 304 can be oriented essentially parallel and non-collinear to the center frame section channel 308. The webbing device 300 can be manufactured from aluminum or an aluminum alloy in some embodiments, but any structurally strong material could be used including steel, titanium, composite materials, thermoplastic polymers, carbon fiber, as well as from other materials that would be deemed suitable to one of ordinary skill in the art with the present disclosure before them.

The webbing device 300 can be manufactured as a single piece (or multiple pieces) using die casting, injection molding, hydroforming, extrusion, welding, or other well-known methods of manufacturing a structural material. In some embodiments, these formed, webbing devices 300 can be integrated into vehicle underbodies that distribute load vectors away from crash points. Stated otherwise, the webbing device 300, according to various embodiments, is designed to directionally distribute force loads from impacts along vectors that minimize damage to both the passenger cabin and the battery. The webbing device 300 can provide both structural strength and force load transfer in order to allow a light weight element to provide the same strength as a solid and much heavier piece.

Each of the front end rail channel 304, the front cross member channel 306, and the center frame section channel 308 can comprise one or more anchor points such as anchor point 307 that can allow the webbing device 300 to be secured to various components of the underbody 100.

In various embodiments, the webbing device 300 can be formed so as to create a recess 310. Support webbing 312 can be disposed within the recess 310 to provide a predetermined amount of structural rigidity (e.g., crush resistance). In some embodiments, the support webbing 312 comprises ribs such as rib 314 that extend linearly in rows. The rows of ribs 314 can be parallel to one another.

Members, such as member 316 can extend between the ribs 314 and can be oriented non-perpendicular to the ribs 314. The ribs 314 and members 316 can at least partially form the mounting channels 304, 306, 308 for other structural components of the underbody 100. The front end rail channel 304 can be at least partially formed from at least one member 316. The cross member channel 306 can be at least partially formed from at least one rib 314. The center frame section channel 308 can be at least partially formed from at least one of the ribs 314 and at least one of the members 316.

In some embodiments, the members 316 can be arranged to form triangular cavities or cells. The exact shape and dimensions of the cells can be selectively adjusted based on design requirements, such as desired stiffness, desired load vectors, and crumple force.

In some embodiments, the crumple resistance of the webbing device 300 can be selectively adjusted by adjusting a space between the rows of ribs 314 and a number of the members 316 extending between the rows of ribs 314. The more closely spaced the rows and more numerous the ribs 314, the more crumple resistant the webbing device 300 can be, although additional webbing 312 components will add weight.

Some embodiments can feature designed crumple zones. Such crumple zones can be formed by selectively adjusting the spacing of the rows and/or number of ribs 314 of the support webbing 312. It will be understood, that by creating areas of greater and lesser rigidity along a chosen axis of the support webbing 312, the webbing device 300 can be designed to crumple at the area of lesser rigidity. Using similar techniques, such crumple zones can also be configured to transfer load forces along vectors directed away from the passenger and/or battery compartments.

In some embodiments, the webbing device 300 can comprise a mounting bracket (flange) 318 that can receive at least a portion of an upper body of a vehicle (not shown).

Figure 15:
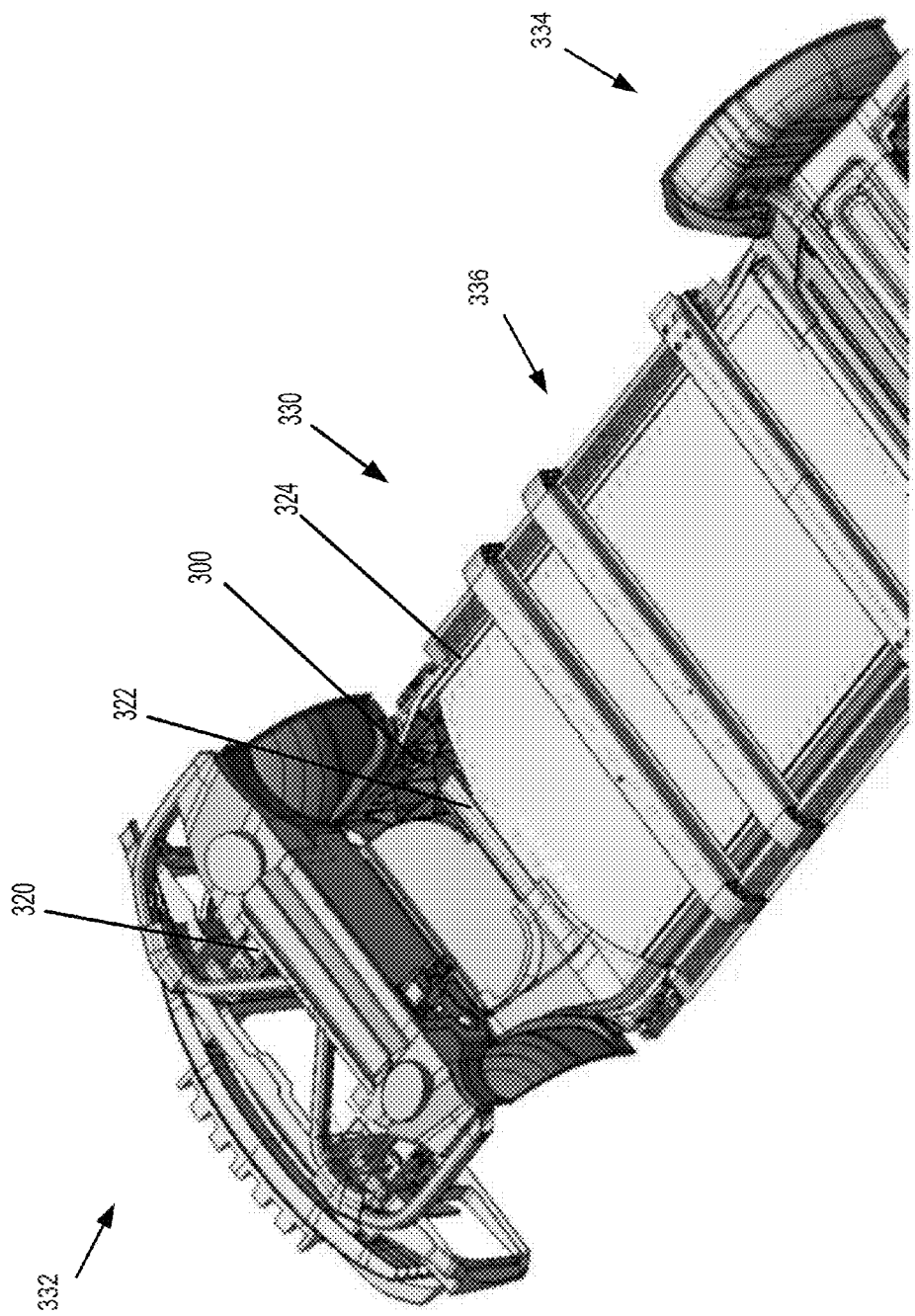
FIG. 15 is a perspective view of the exemplary webbing device in combination with an underbody of a vehicle.
Figure 16:
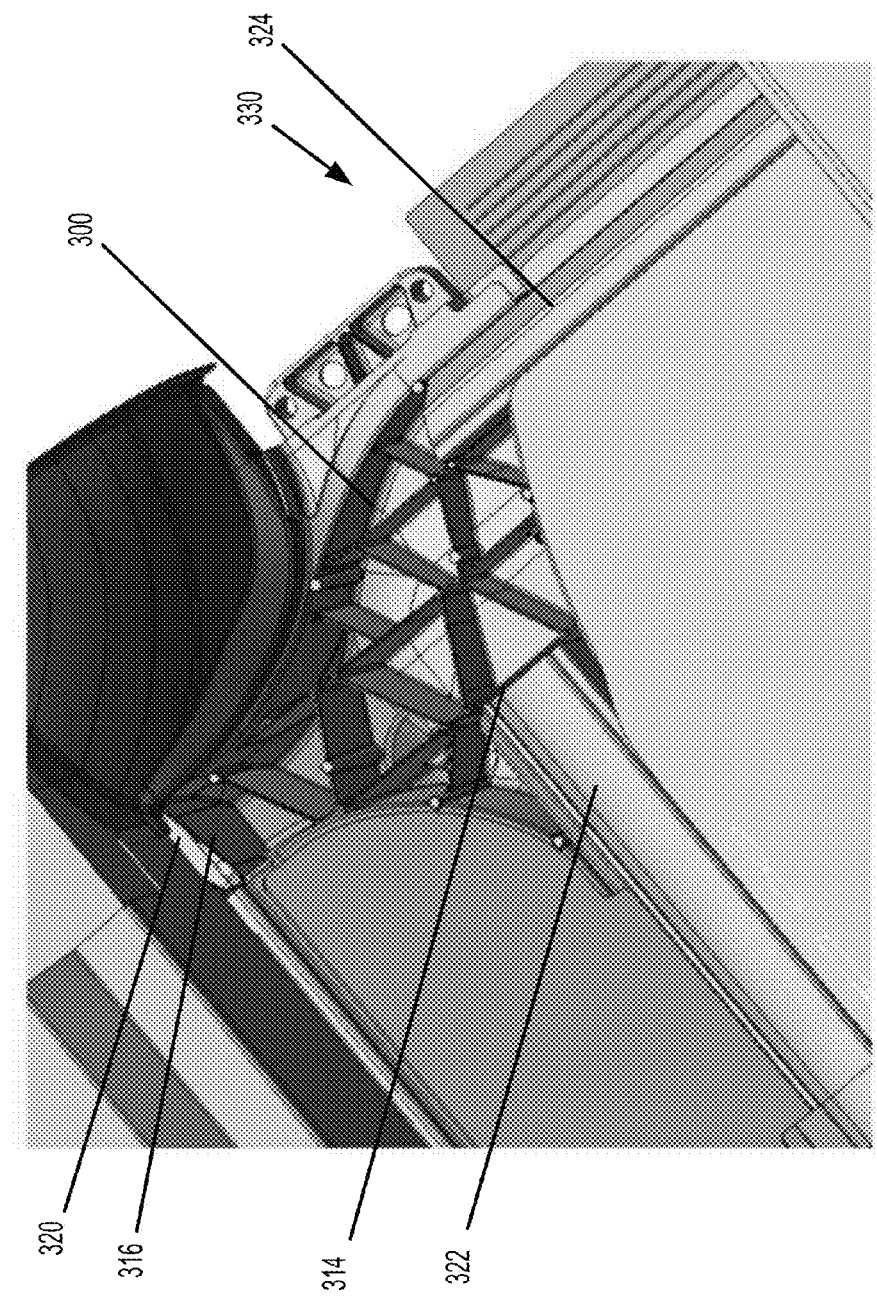
FIG. 16 is a close-up perspective view of the exemplary webbing device in combination with an underbody of a vehicle.
Figure 17:
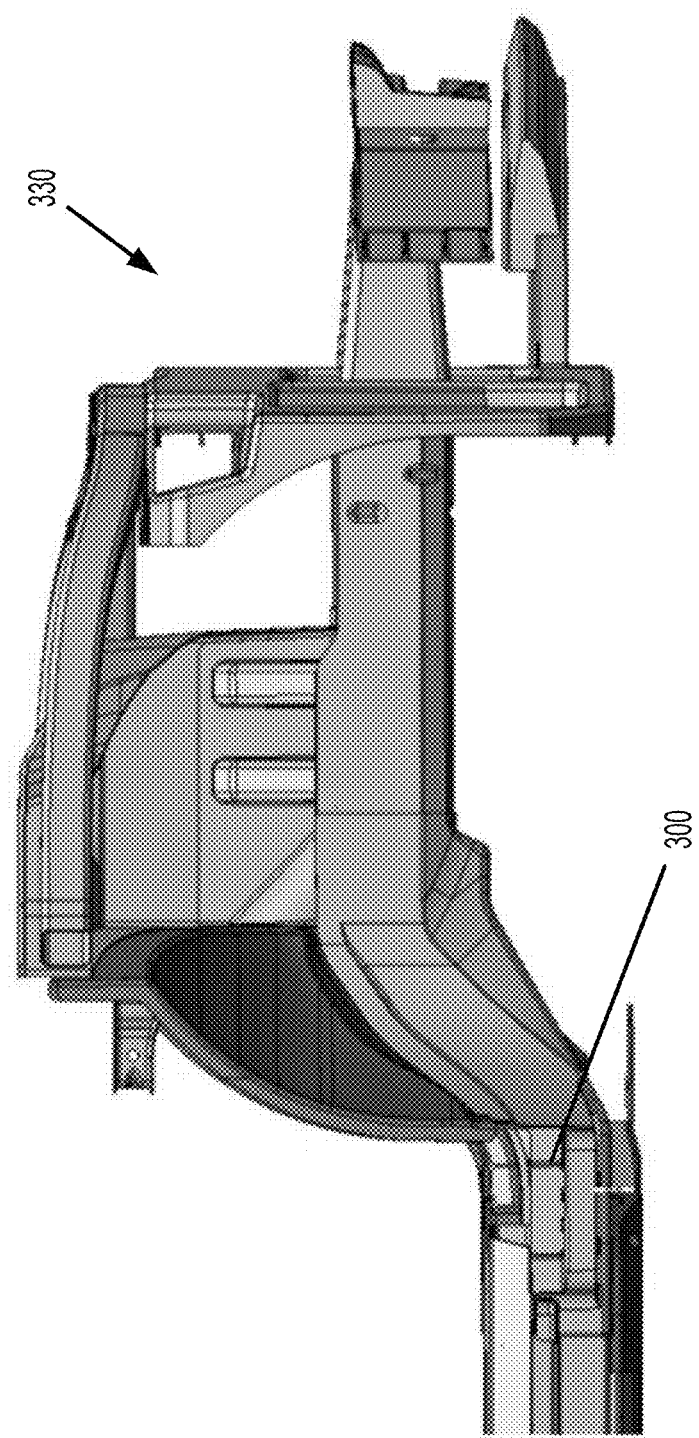
FIG. 17 is a side elevation view of the exemplary webbing device in combination with an underbody of a vehicle.

In FIGS. 15-17, advantageously, some embodiments of the webbing device 300 provide architectural flexibility for selectively adjusting a size or configuration of the vehicle. While a single webbing device 300 associated with a corner of an underbody 330 is illustrated, it will be understood that each of the four corners of the underbody 330 can each comprise a corresponding webbing device 300 such that two webbing devices 300 can be associated with a front end 332 of the underbody 330 and two webbing devices 300 can be associated with a rear end 334 of the underbody 330, and provide a transition from a central underbody section 336 to the front end 332 or the rear end 334 of the underbody 330. In some embodiments, the front end 332 and the rear end 334 pairs of webbing devices 300 can be mirror images of one another, providing for left and right handed configurations.

Referring to FIG. 15-17, in various embodiments, elements around this webbing device 300 structure, such as a front end rail 320, a front cross member 322, and a center frame section 324, can be changed to lengthen or shorten without significantly altering the structural integrity and/or crash worthiness of the vehicle. To be sure, this example webbing device 300 can function as a crumple node within the underbody 330 that can absorb and direct force loads irrespective of the size of the body structures attached to the webbing device 300. In various embodiments, the webbing device 300 can be designed to allow a variety of body shells to be mounted thereto using the flange 318.

FIGS. 16 and 17 collectively illustrate the integration, in various exemplary embodiments, of the webbing device 300 into a part of the suspension and sub-frame (referred to herein collectively as the "underbody" and identified as 330 in the examples in FIGS. 16 and 17).

In the example configuration in FIG. 16, the front cross member 322 is illustrated as abutting one of the ribs 314 of the webbing 312, the front end rail 320 abuts one of the members 316, and the center frame section 324 abuts both a rib 314 and a member 316. Additionally, as also illustrated in FIG. 3, the webbing devices 300 can orient the left center frame section 142 and the right center frame section 144 in a first plane, while orienting the front end rails 320 is a second plane different than the first plane. Similarly, the webbing devices 300 can orient the rear end rails 196A, 196B in a third plane different than the first plane. In some embodiments, the second and third planes can be the same. Referring also to FIGS. 2 and 13, the webbing devices 300 can orient the end rails 320 or 196A, 196B such that a first spaced apart distance between the end rails 320 or 196A, 196B is less than a second spaced apart distance between the left center frame rail 142 and the right center frame rail 144.

As described above, the webbing devices 300 can be positioned at the corners of the central underbody section 336 as illustrated in FIG. 15. The flange 318 of the webbing device 300 can receive at least a portion of an upper body of a vehicle. Given the position of the webbing device 300 on the underbody 330, the webbing device 300 can be subjected to intense forces if the vehicle is involved in an impact with another object. If the upper body is rigidly coupled to the webbing device 300, then these forces can be transmitted to the passenger compartment and the battery compartment within the underbody 330. The webbing device 300 can be designed with crumple zones formed by selectively adjusting the spacing of the rows and/or number of the ribs 314 as described previously. In addition to these crumple zones, a connector coupling the upper body to the flange 318 can also serve to redirect crash forces away from the passenger and battery compartments.

Figure 18:
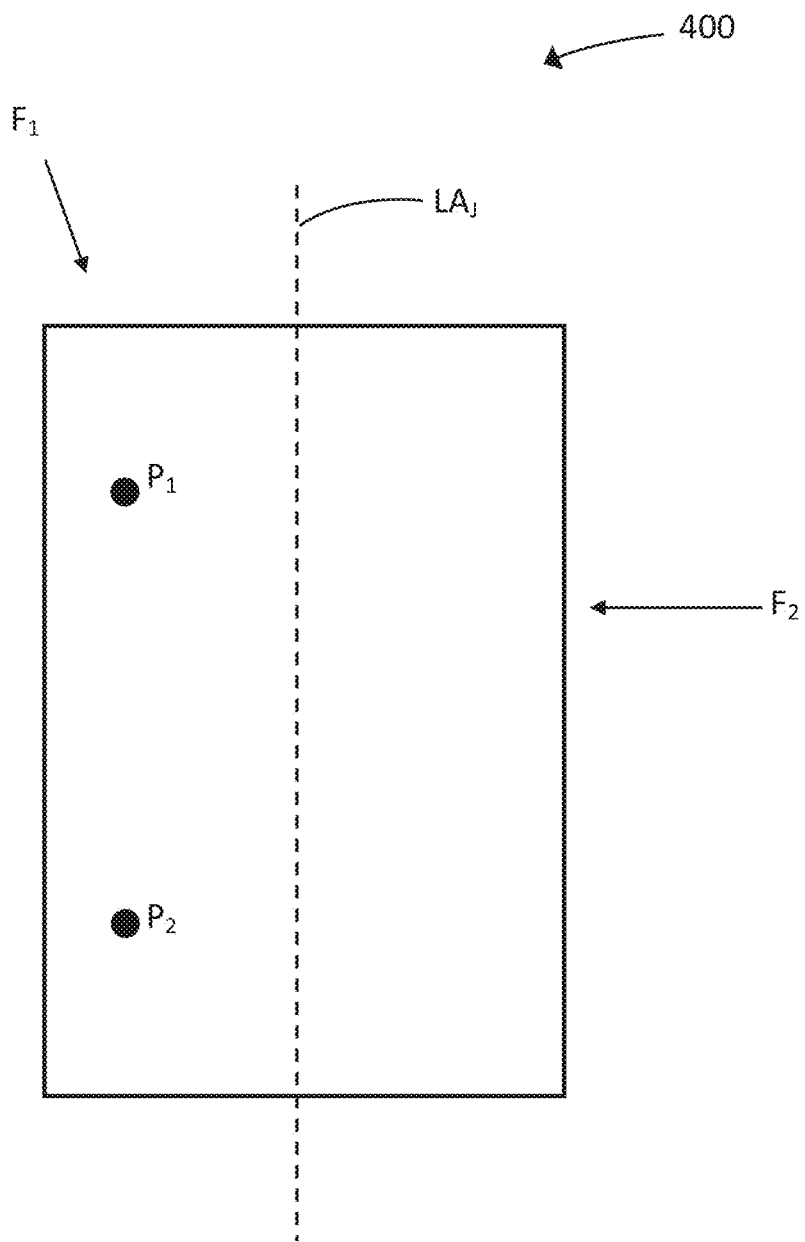
FIG. 18 is a schematic diagram of a joint with two pivot points.

FIG. 18 schematically illustrates a joint 400, which can be a heel-toe joint 400, to couple the upper body to the flange 318 according to various embodiments. The joint 400 can have a longitudinal axis $LA_J$ generally oriented towards the front end 332 and the rear end 334 of the underbody 330. The joint 400 can further comprise a first pivot point $P_1$ and a second pivot point $P_2$. In some embodiments, the first and second pivots points $P_1$, $P_2$ can be positioned on one side of the longitudinal axis $LA_J$. The joint 400 can be subjected to a variety of forces in a crash, for example force $F_1$ in a frontal impact and $F_2$ in a side impact.

Figure 19:
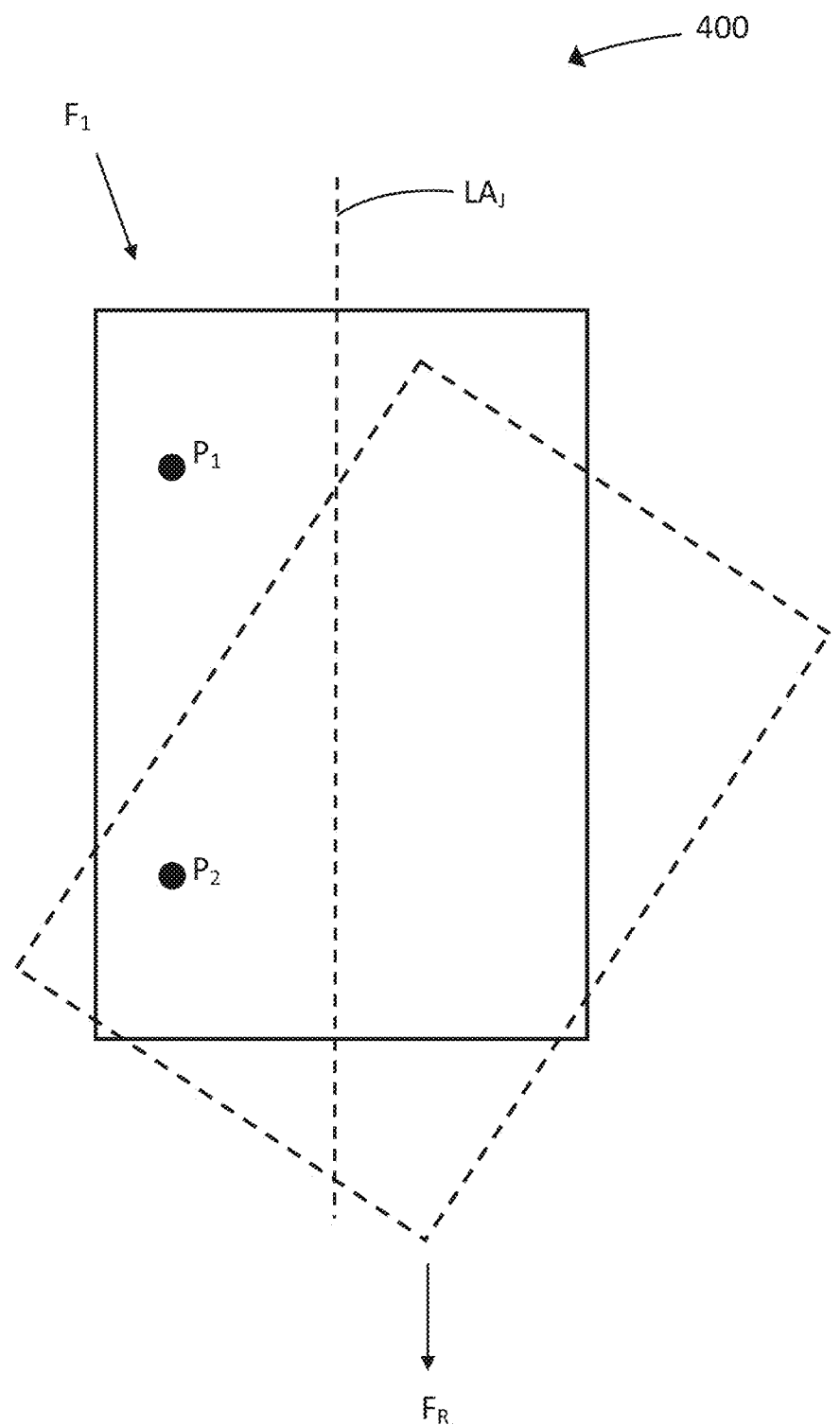
FIG. 19 is a schematic diagram of a joint pivoting at one of two pivot points when a force is applied to the joint.
Figure 20:
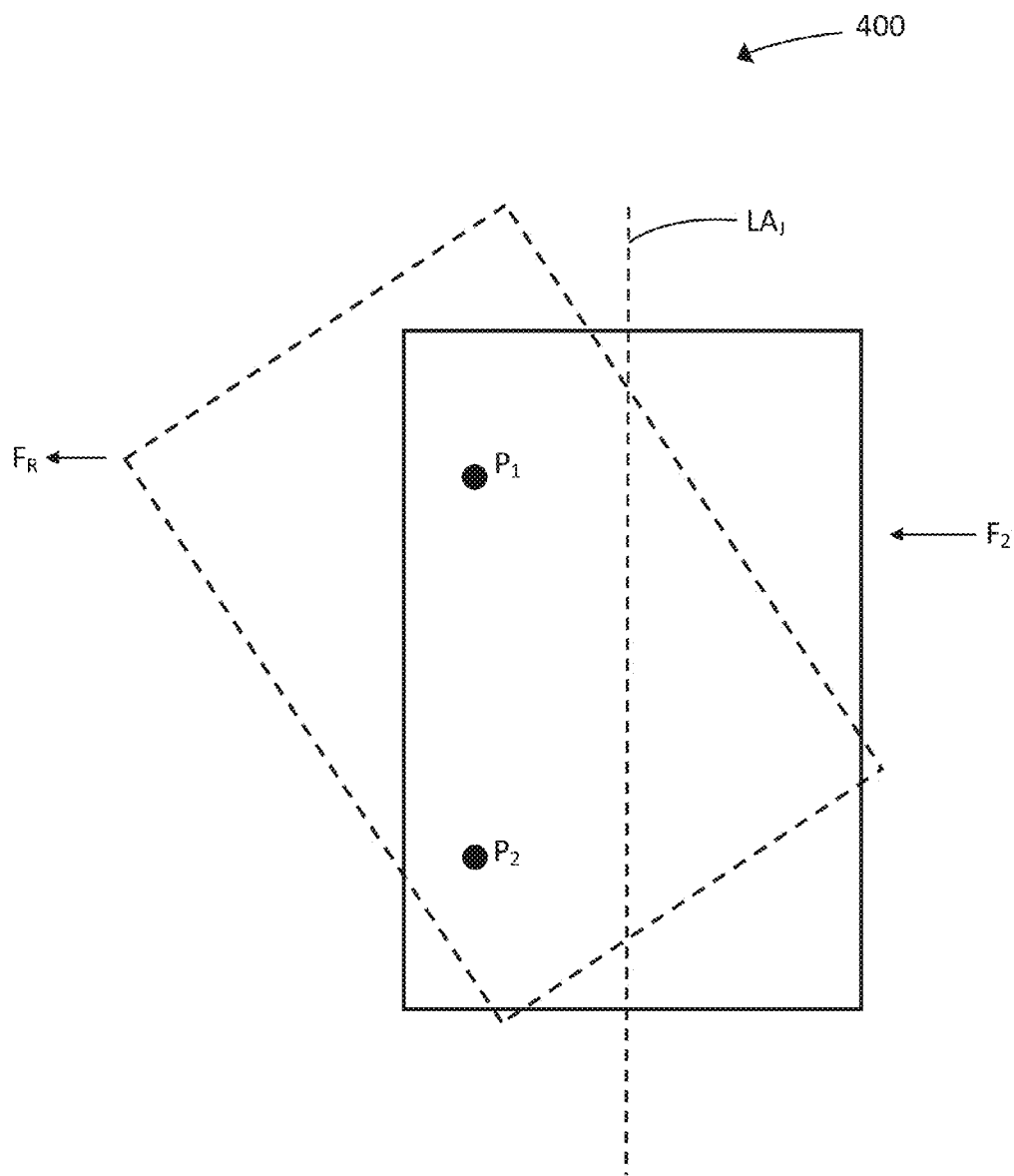
FIG. 20 is a schematic diagram of a joint pivoting at one of two pivot points when a force is applied to the joint.

Referring now to FIG. 19, the joint 400 can be subjected to the force $F_1$ which can cause the joint 400 to pivot at pivot point $P_2$. This pivoting movement can redirect the impact force $F_1$ as a resultant force $F_R$ which can be directed in a different direction than the force $F_1$. The direction of the resultant force $F_R$ can be away from the passenger and battery compartments. Similarly, FIG. 20 illustrates the side impact force $F_2$ causing the joint 400 to pivot at the second pivot point $P_2$ and redirecting the side impact force $F_2$ as the resultant force $F_R$. While FIGS. 19 and 20 illustrate the joint 400 pivoting at the second pivot point $P_2$, one skilled in the art would readily recognize that the joint 400 can also pivot at the first pivot point $P_1$ depending upon where the impact force $F_1$, $F_2$ acts on the joint 400.

Figure 21:
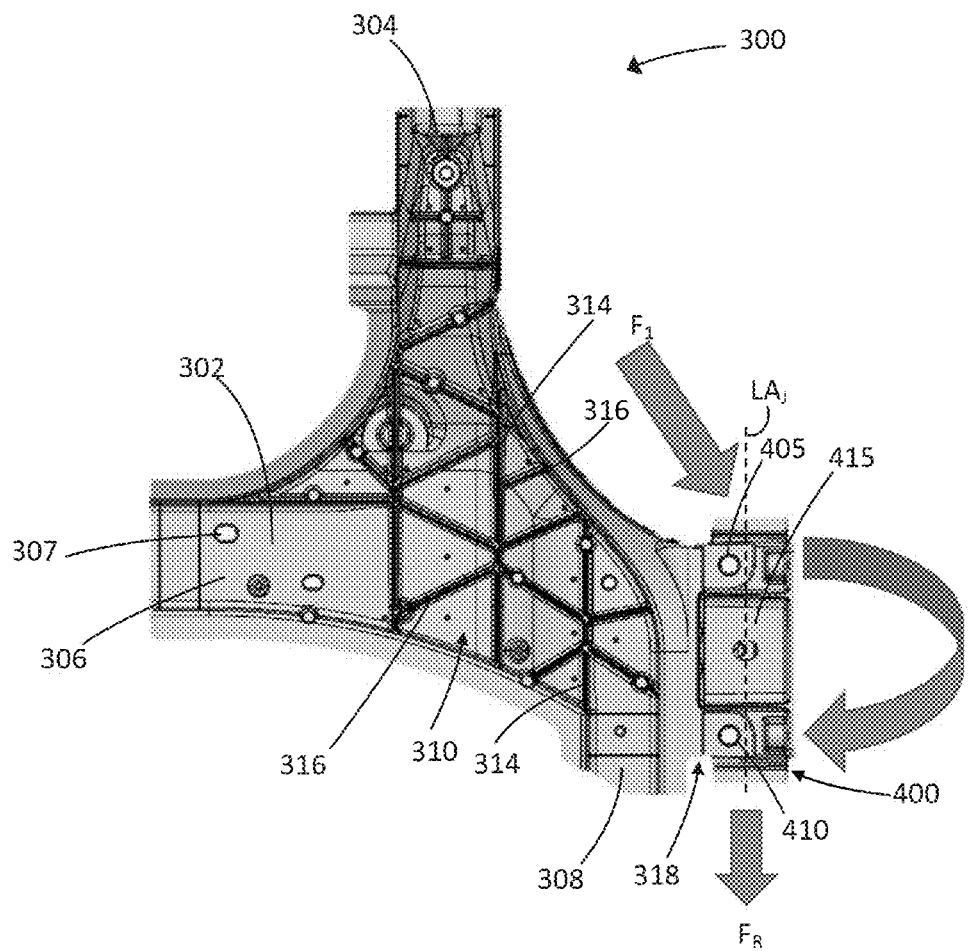
FIG. 21 is a top view of a joint coupled to a webbing device.

FIG. 21 illustrates a top view of the webbing device 300 with the joint 400 positioned on the flange 318. The joint 400 can comprise a central body member 415. The central body member 415 can further comprise first mounting hole 405 and second mounting hole 410 corresponding to the first pivot point $P_1$ and the second pivot point $P_2$, respectively.

The first and second mounting holes 405, 410 can align with similar holes in the flange 318 (see FIG. 14). Similar to FIG. 19, FIG. 21 illustrates an impact force $F_1$ acting on the joint 400. The force $F_1$ can cause the joint 400 to pivot at the second mounting hole 410 (second pivot point $P_2$) as indicated by the curved arrow in FIG. 21. The pivoting movement of the joint 400 can redirect the impact force $F_1$ as the resultant force $F_R$.

The joint 400 can be manufactured from any structurally strong material including iron, steel, titanium, aluminum or an aluminum alloy, composite materials, thermoplastic polymers, carbon fiber, as well as from other materials that would be deemed suitable to one of ordinary skill in the art with the present disclosure before them.

Figure 26:
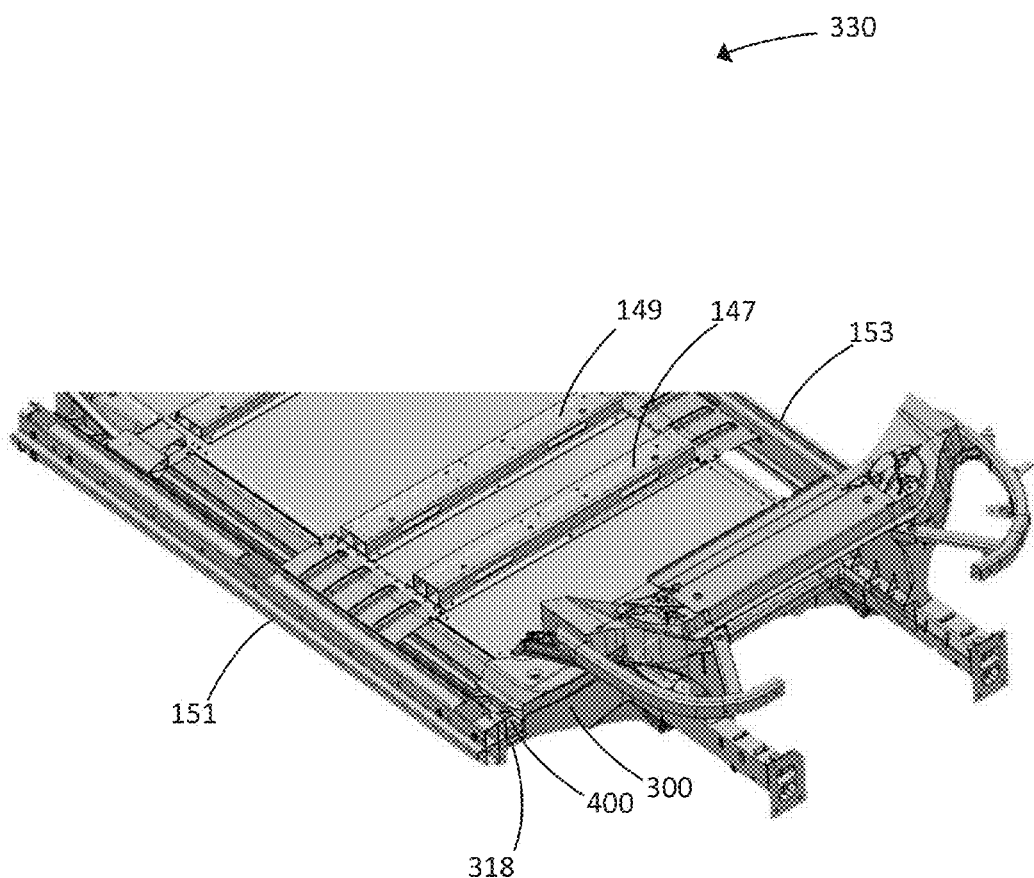
FIG. 26 is a front perspective view of a joint coupled to a vehicle underbody and a frame rail coupled to the joint.

As described in this disclosure, joint 400 can be coupled to an outer vehicle rail (e.g., rails 151/153 in FIGS. 13 and 26) that extends along the length of the vehicle underbody; as such, joint 400 can couple the outer vehicle rail to flange 318. For example, in FIG. 21, joint 400 can be coupled to an outer vehicle rail (not illustrated) that extends from joint 400 towards the bottom of the page (e.g., along the direction of $F_R$). Further, as additionally described in this disclosure, flange 318 can be coupled to an inner vehicle rail (e.g., rails 142/144 in FIGS. 3 and 7) that also extends along the length of the vehicle underbody, and that can be substantially parallel to the outer vehicle rail mentioned above. For example, in FIG. 21, flange 318 can be coupled, via center frame section channel 308 of webbing device 300, to an inner vehicle rail (not illustrated) that extends from center frame section channel 308 towards the bottom of the page (e.g., along the direction of $F_R$), substantially parallel to the outer vehicle rail (not illustrated) described above. Flange 318 can also be coupled to one or more cross members (e.g., cross members 156/158 in FIG. 3) that extend along the width of the vehicle underbody, and that can be substantially perpendicular to the inner and outer vehicle rails mentioned above. For example, in FIG. 21, flange 318 can be coupled, via cross member channel 306 of webbing device 300, to a cross member (not illustrated) that extends from cross member channel 306 towards the left side of the page, substantially perpendicular to the inner and outer vehicle rails (not illustrated) described above. It is understood that the configuration of joint 400, flange 318, webbing device 300, the inner and outer vehicle rails and the cross member provided here can describe the configuration of one corner of the vehicle frame of this disclosure (e.g., the front-right corner of the vehicle frame). It is further understood that the configuration of other corners of the vehicle frame (e.g., front-left, rear-left and rear-right corners) can have analogous joint, flange, webbing device, inner vehicle rail, outer vehicle rail and cross member configurations to that described here, such as shown in FIGS. 1-2, 7, 13. Finally, the inner vehicle rails on either side of the vehicle frame, and the cross members at the front and back of the vehicle frame, can surround a battery sub-assembly used in the vehicle (e.g., as illustrated in FIG. 3).

In light of the joint 400, flange 318, webbing device 300, inner vehicle rail, outer vehicle rail and cross member configuration described above, the pivoting and force transfer capabilities of joint 400 described with reference to FIGS. 18-21 can transfer a force incident on the flange 318/joint 400 structure (e.g., due to a vehicle collision) away from the inner vehicle rail, and towards the outer vehicle rail, depending on the direction and/or location of the force. Similarly, joint 400 can transfer a force incident on the flange 318/joint 400 structure (e.g., due to a vehicle collision) away from the inner vehicle rail, and towards a cross member of the vehicle underbody depending on the direction and/or location of the force. As such, joint 400 and/or flange 318 can be configured to transfer forces away from and around (e.g., to the outer vehicle rails, to the cross members, etc.) the battery sub-assembly of the vehicle, which can reduce the likelihood of battery failure and danger caused by such failure in a vehicle collision. Additionally, joint 400 and/or flange 318 can be configured to perform this function substantially independently of the length or width of the vehicle underbody (e.g., defined by the lengths of the inner and outer vehicle rails and cross members), therefore decoupling the force transfer capabilities of the vehicle underbody from the size of the vehicle underbody, and allowing substantial flexibility in selecting the size of the scalable vehicle frame of this disclosure. Further, this force-transfer design of the vehicle underbody can also allow crumple zones (e.g., formed at the front and rear of the vehicle, as described in this disclosure) to be designed independently of the length or width of the vehicle underbody, adding further flexibility to selecting the size of the scalable vehicle frame of this disclosure.

Figure 22:
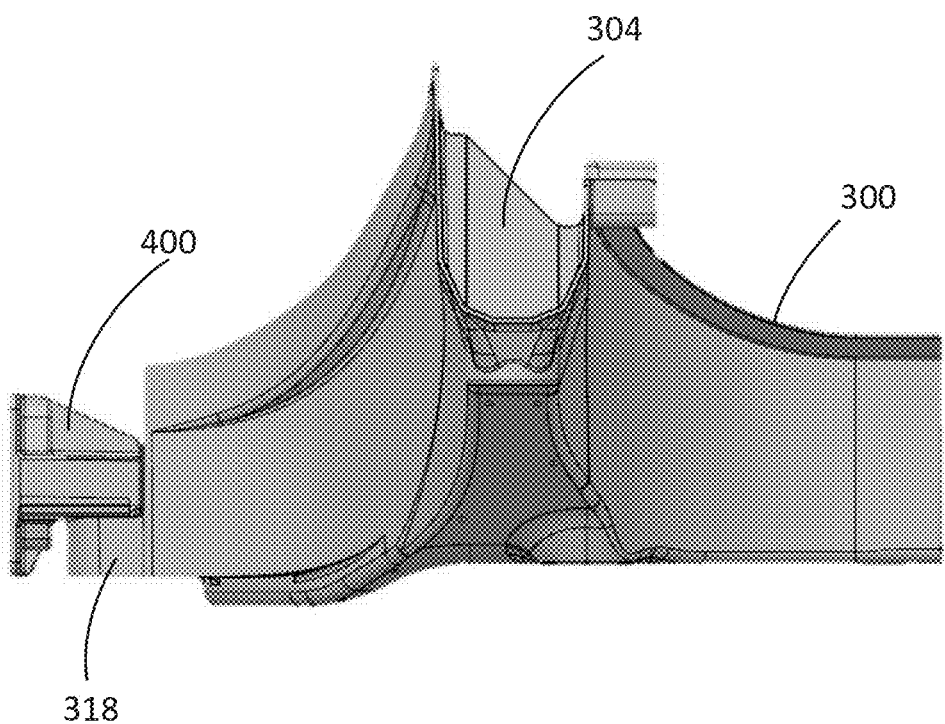
FIG. 22 is a front view of a joint coupled to a webbing device.
Figure 23:
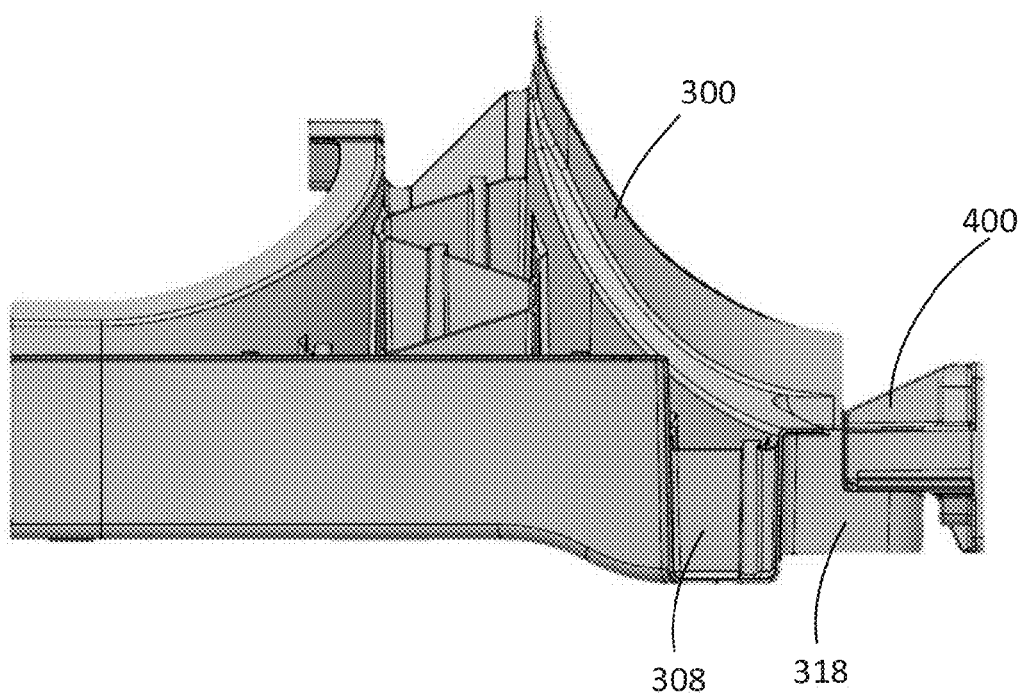
FIG. 23 is a rear view of a joint coupled to a webbing device.
Figure 24:
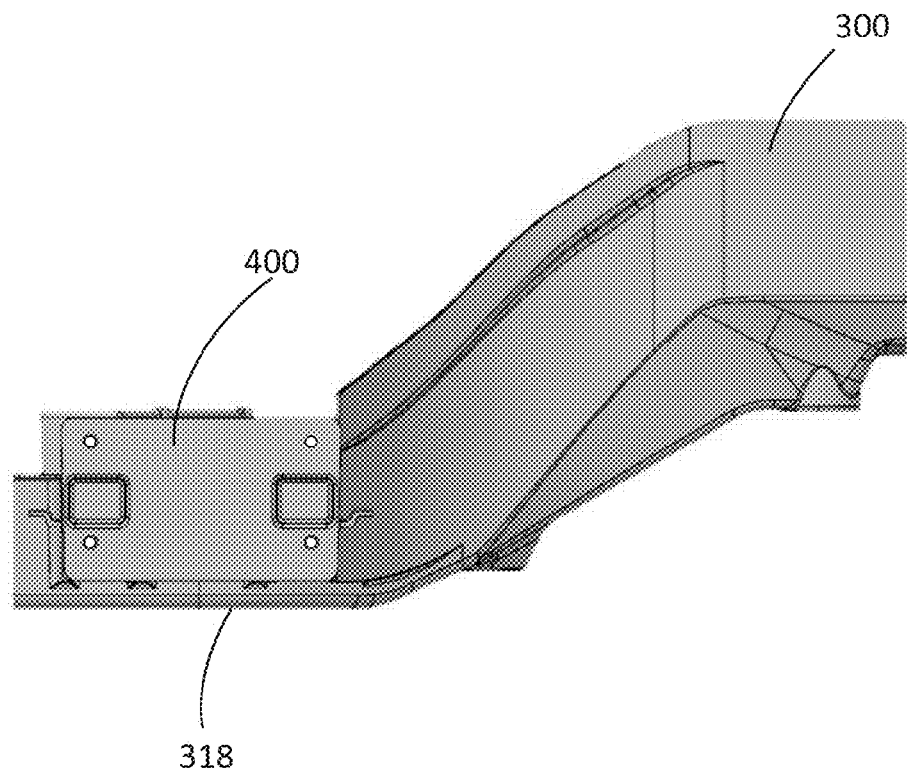
FIG. 24 is a side view of a joint coupled to a webbing device.
Figure 25:
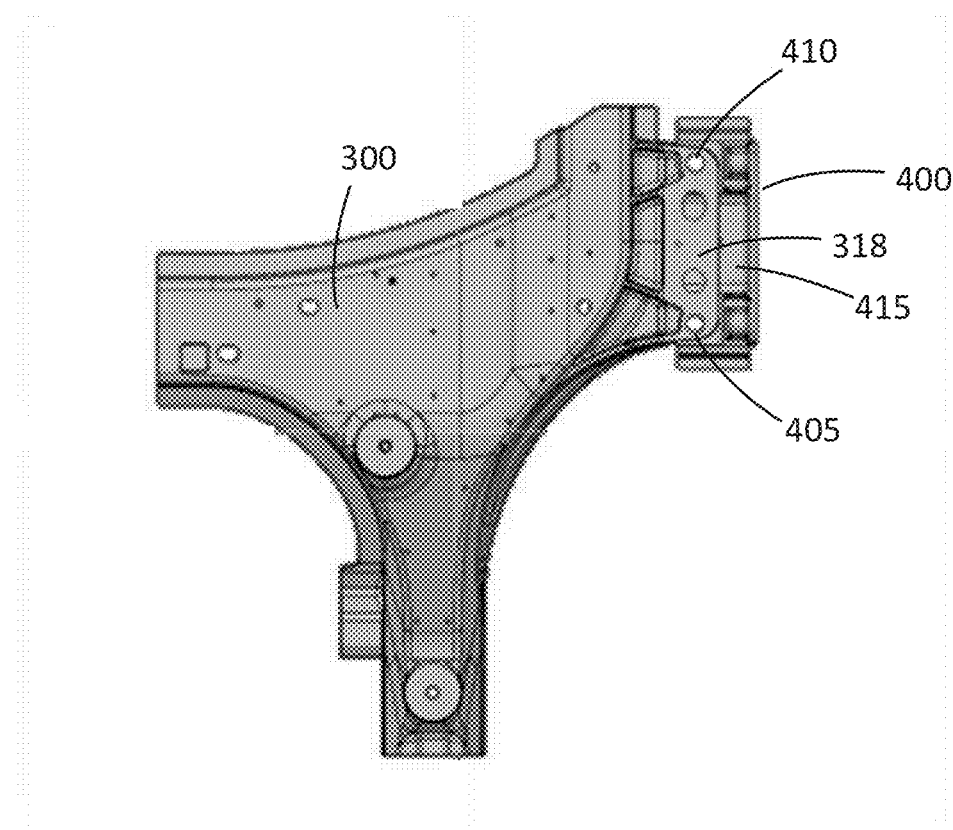
FIG. 25 is a bottom view of a joint coupled to a webbing device.

FIGS. 22 and 23 illustrate front and rear views, respectively, of the webbing device 300 and the joint 400 to more clearly show the joint 400 positioned on the flange 318. FIG. 24 is a side view of the webbing device 300 and the joint 400 to illustrate the alignment of the joint 400 relative to the webbing device 300. FIG. 25 is a bottom view of the webbing device 300 and the joint 400 and illustrates the alignment of the first and second mounting holes 405, 410 of the joint 400 with similar holes in the flange 318.

Figure 27:
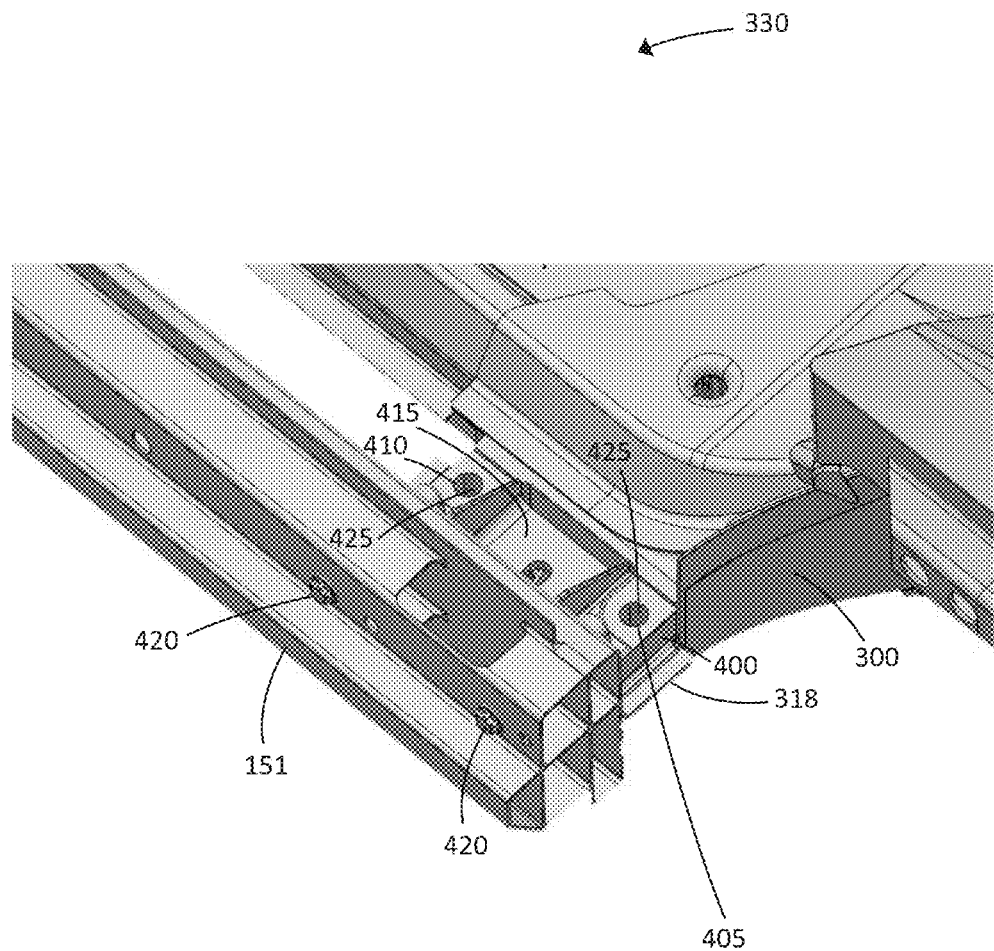
FIG. 27 is close up front perspective view of the joint, vehicle underbody, and frame rail of FIG. 26.
Figure 28:
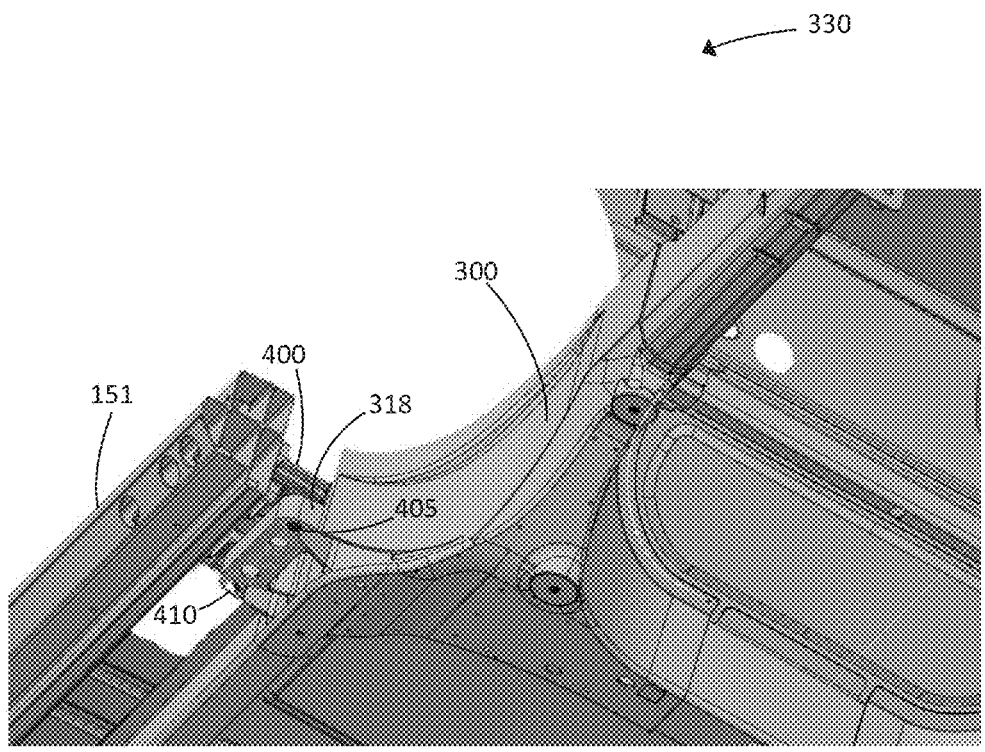
FIG. 28 is a close up bottom perspective view of the joint, vehicle underbody, and frame rail of FIG. 26.

Turning now to FIGS. 26 through 29, the webbing device 300 is shown coupled to the vehicle underbody 330 according to various embodiments. The joint 400 can be coupled to the flange 318 of the webbing device 300, and the vehicle rail (sill) 151 can be coupled to the joint 400 by one or more bolts 420 according to various embodiments. The vehicle rail 151 can comprise a portion of an upper body of the vehicle. FIG. 27 is a detail view of the coupled webbing device 300, the flange 318, the joint 400, and the vehicle rail 151. A coupling device, such as a bolt 425, can be positioned in each of the first and second mounting holes 405, 410 to couple the joint 400 to the flange 318. The bolts 425 can comprise a cylindrical shaft that can provide an axis upon which the joint 400 can rotate. The bolts 425 can be manufactured from any structurally strong material including iron, steel, titanium, aluminum or an aluminum alloy, composite materials, thermoplastic polymers, carbon fiber, as well as from other materials that would be deemed suitable to one of ordinary skill in the art with the present disclosure before them.

Referring to FIGS. 21 and 27, the force $F_1$ can cause the joint 400 to rotate and redistribute and redirect the force $F_1$ as the resultant force $F_R$. By way of the example illustrated in FIG. 27, the resultant force $F_R$ can be redirected along the vehicle rail 151, thereby distributing the resultant force $F_R$ over a larger portion of the underbody 330 through the middle support members 147, 149 and other underbody 330 structural components (see for example FIG. 13), and generally away from the passenger and battery compartments.

When a force such as the force $F_1$ as illustrated in FIG. 21 acts upon the joint 400, the joint 400 can fail in the proximity of where the force $F_1$ is applied. The failure in this example can be a fracture of the joint 400 so that it separates from the bolt 425 in the first mounting hole 405. Alternatively, the joint 400 can remain intact and instead the bolt 425 in the first mounting hole 405 can fail. In either case, the joint is now rigidly coupled to the flange 318 only at the second mounting hole 410, which now acts as a pivot point for the pivoting movement of the joint 400. Depending on the point of application of the force $F_1$, the failure of the joint 400 can instead occur in proximity to the second mounting hole 410, thereby allowing the joint 400 to pivot using the first mounting hole 405 as the pivot point.

Figure 29:
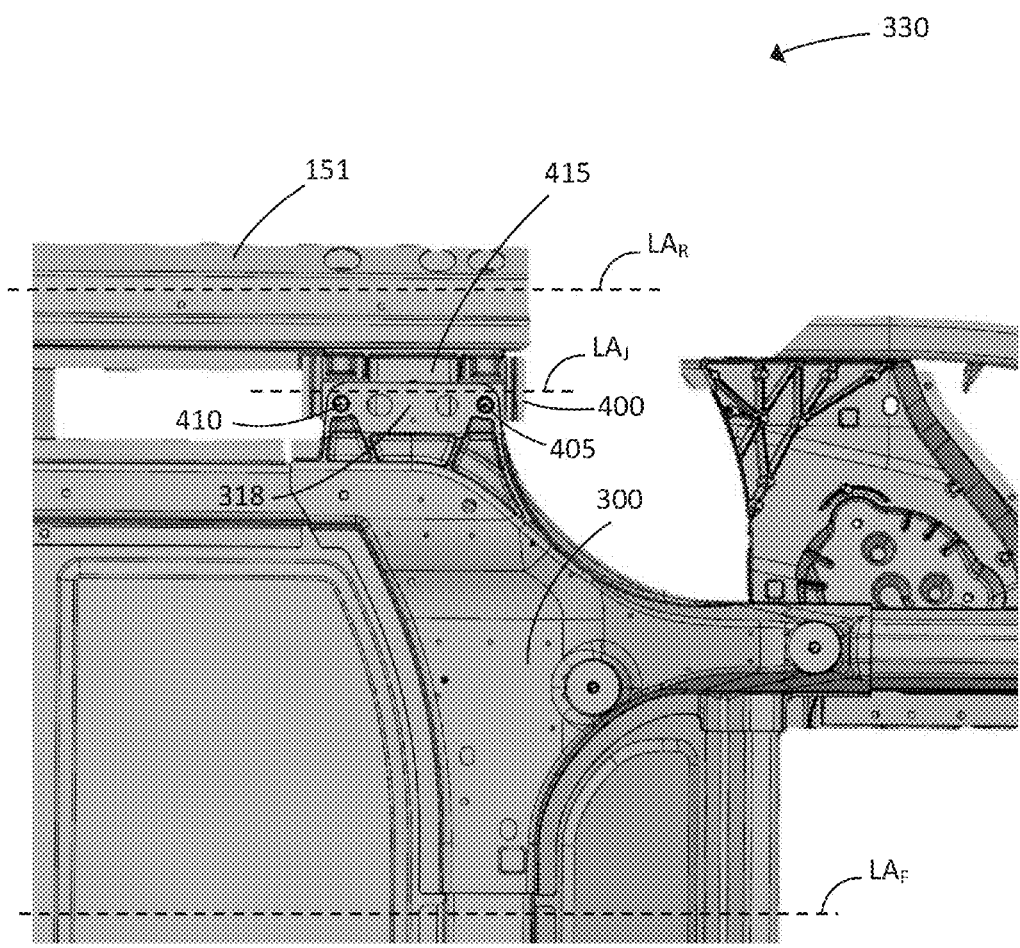
FIG. 29 is a close up bottom view of the joint, vehicle underbody, and frame rail of FIG. 26.

According to the embodiments illustrated in FIG. 29, which illustrates a bottom detail view of the webbing device 300, the joint 400, and the vehicle rail 151 in an assembled configuration, the longitudinal axis $LA_J$ of the joint 400 can be oriented towards the front end 332 and the rear end 334 of the underbody 330. This arrangement places the longitudinal axis $LA_J$ of the joint 400 essentially parallel to a longitudinal axis $LA_F$ of the frame 110 of the underbody 330. Similarly, since the vehicle rail 151 is positioned parallel to the left center frame section 142 and the right center frame section 144, a longitudinal axis $LA_R$ of the vehicle rail 151 is also parallel to the longitudinal axis $LA_F$ of the frame 110. This geometric relationship assists with the redistribution of the force $F_1$ when the joint 400 pivots and redirects the force $F_1$ longitudinally along the vehicle rail 151.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A joint for a vehicle, the joint comprising:
   a body member including a longitudinal axis in a first direction configured to:
   be coupled to a vehicle underbody at a first mounting point and at a second mounting point, the first and second mounting points comprising first and second pivot points, respectively, for the body member, wherein each of the first and second mounting points comprise a hole through the body member, and wherein each hole is disposed on a common flange,
   be coupled to a vehicle rail at one or more locations other than the first and second mounting points, the vehicle rail including a longitudinal axis oriented parallel to the longitudinal axis of the body member, and when a force in a second direction different than the first direction is applied to a first location of the body member, pivot at one of the first pivot point and the second pivot point depending on the second direction, the pivoting at least partially transferring the force to the vehicle rail, wherein the first and second mounting points are aligned along the longitudinal axis of the body member.

2. The joint of claim 1, wherein the pivoting of the body member transfers the force to the vehicle rail in the first direction.

3. The joint of claim 1, wherein each of the first and second mounting points comprises a hole through the body member, the holes configured to accept connecting devices that couple the body member to the vehicle underbody.

4. The joint of claim 3, wherein each of the connecting devices comprises a cylindrical shaft, the cylindrical shafts comprising the first and second pivot points of the body member.

5. The joint of claim 1, wherein the body member is configured to be coupled to a cross member of the vehicle underbody that is perpendicular to the vehicle rail, such that the pivoting of the body member transfers at least a portion of the force to the cross member.

6. The joint of claim 1, wherein the vehicle underbody comprises a center frame section that is parallel to the vehicle rail, and the pivoting of the body member transfers the force away from the center frame section.

7. The joint of claim 1, wherein the vehicle rail is part of a vehicle upper body.

8. A joint for a vehicle, the joint comprising:
  a body member including a longitudinal axis in a first direction configured to:
    be coupled to a vehicle underbody at a first mounting point and at a second mounting point, the first and second mounting points comprising first and second pivot points, respectively, for the body member, wherein each of the first and second mounting points comprise a hole through the body member, and wherein each hole is disposed on a common flange,
    be coupled to a vehicle rail at one or more locations other than the first and second mounting points, the vehicle rail including a longitudinal axis oriented parallel to the longitudinal axis of the body member, and
    when a force in a second direction different than the first direction is applied to a first location of the body member, pivot at one of the first pivot point and the second pivot point depending on the second direction, the pivoting at least partially transferring the force to the vehicle rail, wherein the first and second mounting points are aligned along the longitudinal axis of the body member and the pivoting of the body member transfers the force to the vehicle rail in the first direction.

9. The joint of claim 8, wherein each of the first and second mounting points comprises a hole through the body member, the holes configured to accept connecting devices that couple the body member to the vehicle underbody.

10. The joint of claim 9, wherein each of the connecting devices comprises a cylindrical shaft, the cylindrical shafts comprising the first and second pivot points of the body member.

11. The joint of claim 8, wherein the body member is configured to be coupled to a cross member of the vehicle underbody that is perpendicular to the vehicle rail, such that the pivoting of the body member transfers at least a portion of the force to the cross member.

12. The joint of claim 8, wherein the vehicle underbody comprises a center frame section that is parallel to the vehicle rail, and the pivoting of the body member transfers the force away from the center frame section.

13. The joint of claim 8, wherein the vehicle rail is part of a vehicle upper body.

14. A joint for a vehicle, the joint comprising:
  a body member including a longitudinal axis in a first direction configured to:
    be coupled to a vehicle underbody at a first mounting point and at a second mounting point, the first and second mounting points comprising first and second pivot points, respectively, for the body member, wherein each of the first and second mounting points comprise a hole through the body member, and wherein each hole is disposed on a common flange,
    be coupled to a vehicle rail at one or more locations other than the first and second mounting points, the vehicle rail including a longitudinal axis oriented parallel to the longitudinal axis of the body member, and
    when a force in a second direction different than the first direction is applied to a first location of the body member, pivot at one of the first pivot point and the second pivot point depending on the second direction, the pivoting at least partially transferring the force to the vehicle rail, wherein the body member is configured to be coupled to a cross member of the vehicle underbody that is perpendicular to the vehicle rail, such that the pivoting of the body member transfers at least a portion of the force to the cross member.

15. The joint of claim 14, wherein the first and second mounting points are aligned along the longitudinal axis of the body member.

16. The joint of claim 15, wherein the pivoting of the body member transfers the force to the vehicle rail in the first direction.

17. The joint of claim 14, wherein each of the first and second mounting points comprises a hole through the body member, the holes configured to accept connecting devices that couple the body member to the vehicle underbody.

18. The joint of claim 17, wherein each of the connecting devices comprises a cylindrical shaft, the cylindrical shafts comprising the first and second pivot points of the body member.

19. The joint of claim 14, wherein the vehicle underbody comprises a center frame section that is parallel to the vehicle rail, and the pivoting of the body member transfers the force away from the center frame section.

20. The joint of claim 14, wherein the vehicle rail is part of a vehicle upper body.

* * * * *